US012657025B2

(12) United States Patent
Lowes et al.

(10) Patent No.: US 12,657,025 B2
(45) Date of Patent: Jun. 16, 2026

(54) METHODS, SYSTEMS, AND APPARATUSES FOR VARIABLE WIDTH UNALIGNED FETCH IN A PROCESSOR

(71) Applicant: Intel Corporation, Santa Clara, CA (US)

(72) Inventors: Mathew Lowes, Austin, TX (US); Martin J. Licht, Round Rock, TX (US); Jonathan D. Combs, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/148,397

(22) Filed: Dec. 29, 2022

(65) Prior Publication Data

US 2024/0220253 A1 Jul. 4, 2024

(51) Int. Cl.
*G06F 9/30* (2018.01)
*G06F 12/0875* (2016.01)

(52) U.S. Cl.
CPC ...... *G06F 9/30047* (2013.01); *G06F 12/0875* (2013.01)

(58) Field of Classification Search
CPC .......................... G06F 9/30047; G06F 12/0875
See application file for complete search history.

(56) References Cited

U.S. PATENT DOCUMENTS

| | | | |
|---|---|---|---|
| 6,510,475 B1 * | 1/2003 | Bennett ............... | G06F 13/4059 |
| | | | 710/60 |
| 2004/0225771 A1 * | 11/2004 | Riesenman ........... | G06F 13/423 |
| | | | 710/200 |
| 2012/0254589 A1 * | 10/2012 | Corbal San Adrian ...................... | |
| | | | G06F 9/30032 |
| | | | 712/E9.034 |
| 2013/0346698 A1 * | 12/2013 | Waugh ................ | G06F 12/0862 |
| | | | 711/125 |
| 2015/0046673 A1 * | 2/2015 | Barry .................. | G06F 9/30058 |
| | | | 712/7 |
| 2022/0206792 A1 | 6/2022 | Wong et al. | |

* cited by examiner

*Primary Examiner* — Zachary K Huson
(74) *Attorney, Agent, or Firm* — NICHOLSON DE VOS WEBSTER & ELLIOTT LLP

(57) ABSTRACT

Techniques for implementing a variable width unaligned fetch for instructions are described. In certain examples, a hardware processor core includes fetch circuitry to perform a single fetch operation to fetch from a paged memory: (i) a multiple cache line width of instruction data, between a minimum width that is greater than one cache line and a maximum width that is a plurality of cache lines, when the multiple cache line width of the instruction data does not include a page boundary of the paged memory, and (ii) less than or equal to one cache line width of the instruction data when the multiple cache line width of the instruction data does include the page boundary of the paged memory; decoder circuitry to decode a single instruction, comprising an opcode, from the instruction data into a decoded instruction; and execution circuitry to execute the decoded instruction according to the opcode.

24 Claims, 20 Drawing Sheets
(3 of 20 Drawing Sheet(s) Filed in Color)

128-Byte Unaligned Accesses

128-Byte Aligned Accesses

FETCHED RAW INSTRUCTION DATA 400
(FOR EXAMPLE, CACHE DATA BYTES or DATA ASSOCIATED WITH A FETCH (E.G., SUCH AS BRANCH PREDICTION DATA))

| | clip | Fetch Range | Branch |
|---|---|---|---|
| cycle 0 | 0x0074 | 0x0074 -> 0x00bf | 0x00a5 -> 0xa063 |
| cycle 1 | 0xa063 | 0xa063 -> 0xa0bf | 0xa084 -> 0xff00 |
| cycle 2 | 0xff00 | 0xff00 -> 0xff7f | |

128-Byte Unaligned Accesses

FIG. 4B

FETCHED RAW INSTRUCTION DATA 400
(FOR EXAMPLE, CACHE DATA BYTES or DATA ASSOCIATED WITH A FETCH (E.G., SUCH AS BRANCH PREDICTION DATA))

| | clip | Fetch Range | Branch |
|---|---|---|---|
| cycle 0 | 0x0074 | 0x0074 -> 0x007f | |
| cycle 1 | 0x0080 | 0x0080 -> 0x80ff | 0x00a5 -> 0xa063 |
| cycle 2 | 0xa063 | 0xa063 -> 0xa07f | |
| cycle 3 | 0xa080 | 0xa080 -> 0xa0ff | 0xa084 -> 0xff00 |
| cycle 4 | 0xff00 | | |

128-Byte Aligned Accesses

FIG. 4A

Linear-Address Translation to a 4K Byte Page using 4-Level Paging 500

FETCH, BY FETCH CIRCUITRY THAT IMPLEMENTS VARIABLE WIDTH UNALIGNED FETCH, AN INSTANCE OF A SINGLE INSTRUCTION HAVING A FIELD FOR AN OPCODE 701

DECODE THE INSTRUCTION 703

RETRIEVE DATA ASSOCIATED WITH ANY SOURCE OPERAND(S) AND SCHEDULE 705

EXECUTE THE DECODED INSTRUCTION ACCORDING TO THE OPCODE 707

COMMIT A RESULT OF THE EXECUTED INSTRUCTION 709

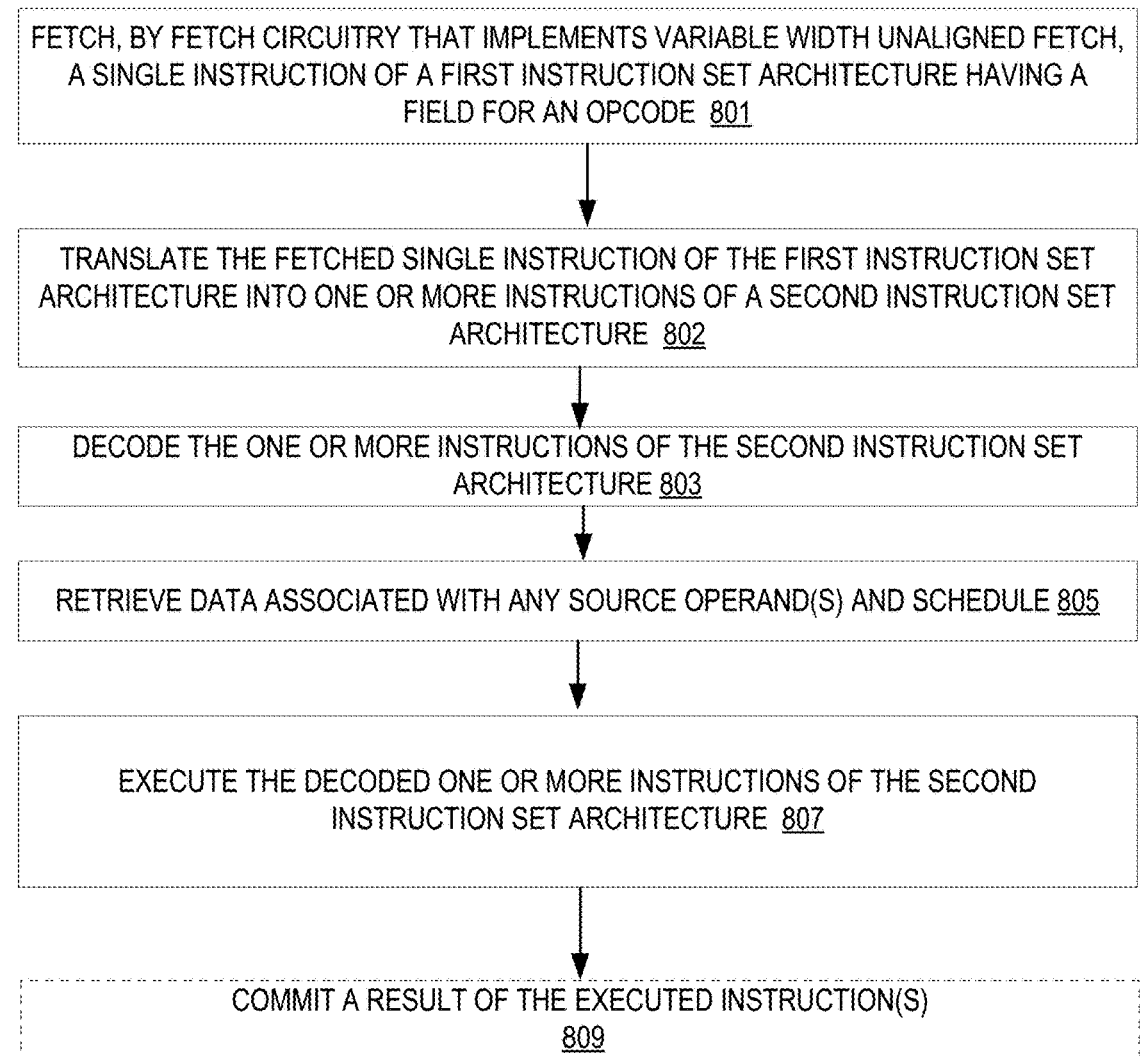

FETCH, BY FETCH CIRCUITRY THAT IMPLEMENTS VARIABLE WIDTH UNALIGNED FETCH, A SINGLE INSTRUCTION OF A FIRST INSTRUCTION SET ARCHITECTURE HAVING A FIELD FOR AN OPCODE 801

TRANSLATE THE FETCHED SINGLE INSTRUCTION OF THE FIRST INSTRUCTION SET ARCHITECTURE INTO ONE OR MORE INSTRUCTIONS OF A SECOND INSTRUCTION SET ARCHITECTURE 802

DECODE THE ONE OR MORE INSTRUCTIONS OF THE SECOND INSTRUCTION SET ARCHITECTURE 803

RETRIEVE DATA ASSOCIATED WITH ANY SOURCE OPERAND(S) AND SCHEDULE 805

EXECUTE THE DECODED ONE OR MORE INSTRUCTIONS OF THE SECOND INSTRUCTION SET ARCHITECTURE 807

COMMIT A RESULT OF THE EXECUTED INSTRUCTION(S) 809

FIG. 8

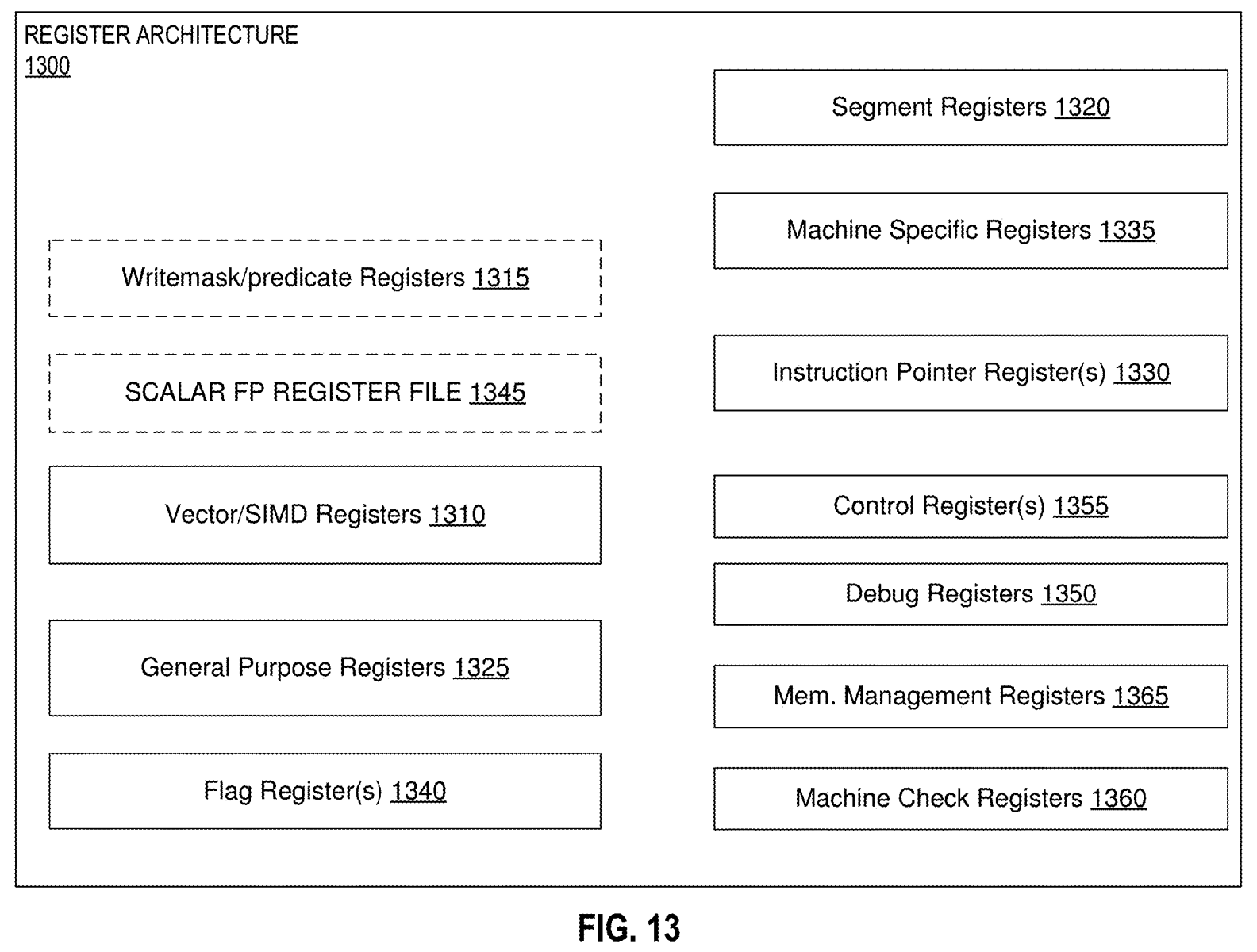

REGISTER ARCHITECTURE 1300

Segment Registers 1320

Machine Specific Registers 1335

Instruction Pointer Register(s) 1330

Control Register(s) 1355

Debug Registers 1350

Mem. Management Registers 1365

Machine Check Registers 1360

Writemask/predicate Registers 1315

SCALAR FP REGISTER FILE 1345

Vector/SIMD Registers 1310

General Purpose Registers 1325

Flag Register(s) 1340

FIG. 13

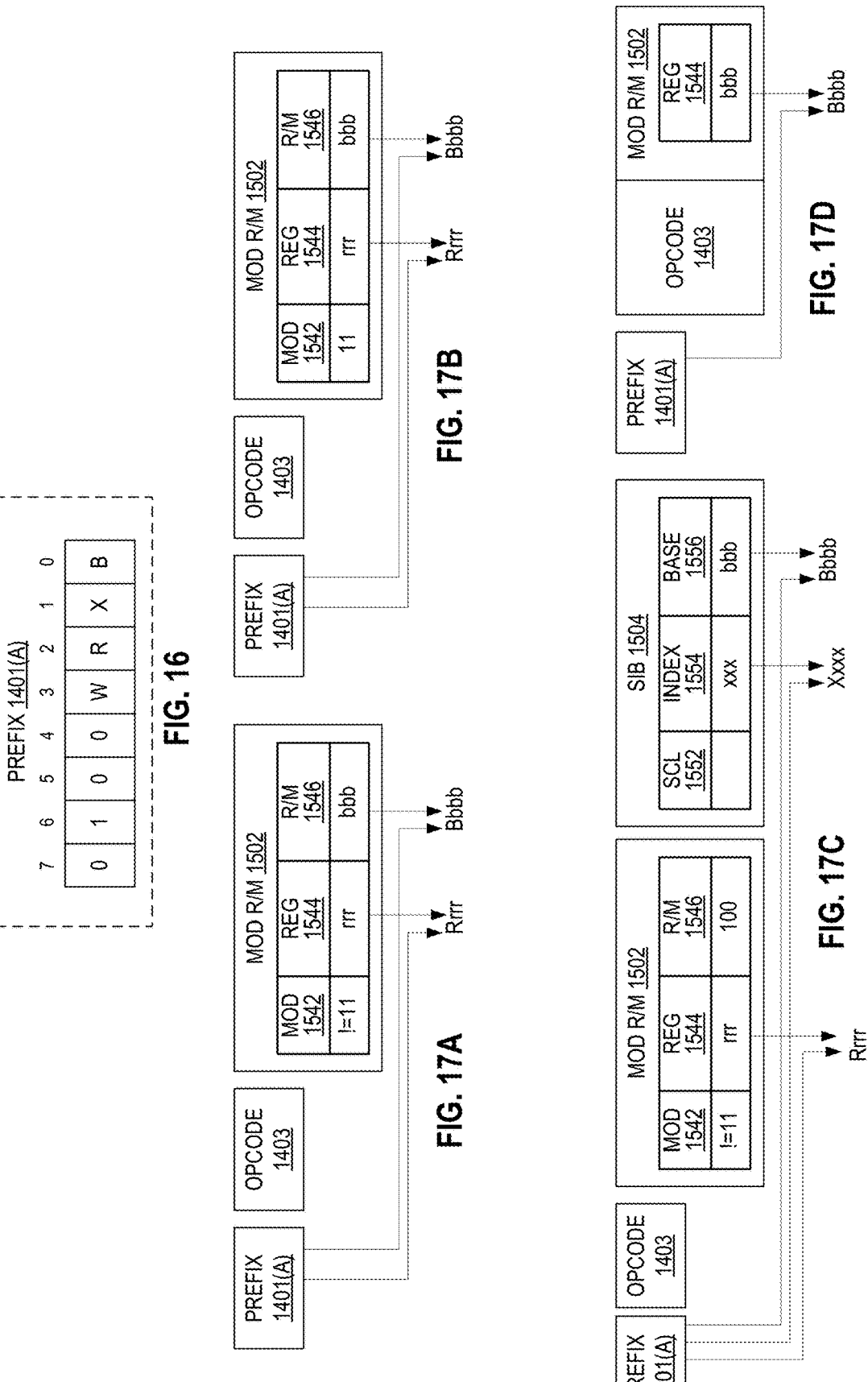

METHODS, SYSTEMS, AND APPARATUSES FOR VARIABLE WIDTH UNALIGNED FETCH IN A PROCESSOR

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF DRAWINGS

The patent or application file contains at least one drawing executed in color. Copies of this patent or patent application publication with color drawing(s) will be provided by the Office upon request and payment of the necessary fee.

Various examples in accordance with the present disclosure will be described with reference to the drawings, in which:

FIG. 4A illustrates fetched raw instruction data from a 128 Byte aligned fetch according to some examples.

FIG. 4B illustrates fetched raw instruction data from a variable width up to 128 Byte unaligned fetch according to some examples.

FIG. 8 illustrates an example method to process an instruction using emulation or binary translation.

FIG. 13 is a block diagram of a register architecture according to some examples.

FIG. 16 illustrates examples of a first prefix.

FIGS. 17A-17D illustrate examples of how the R, X, and B fields of the first prefix in FIG. 16 are used.

DETAILED DESCRIPTION

Figure 1:
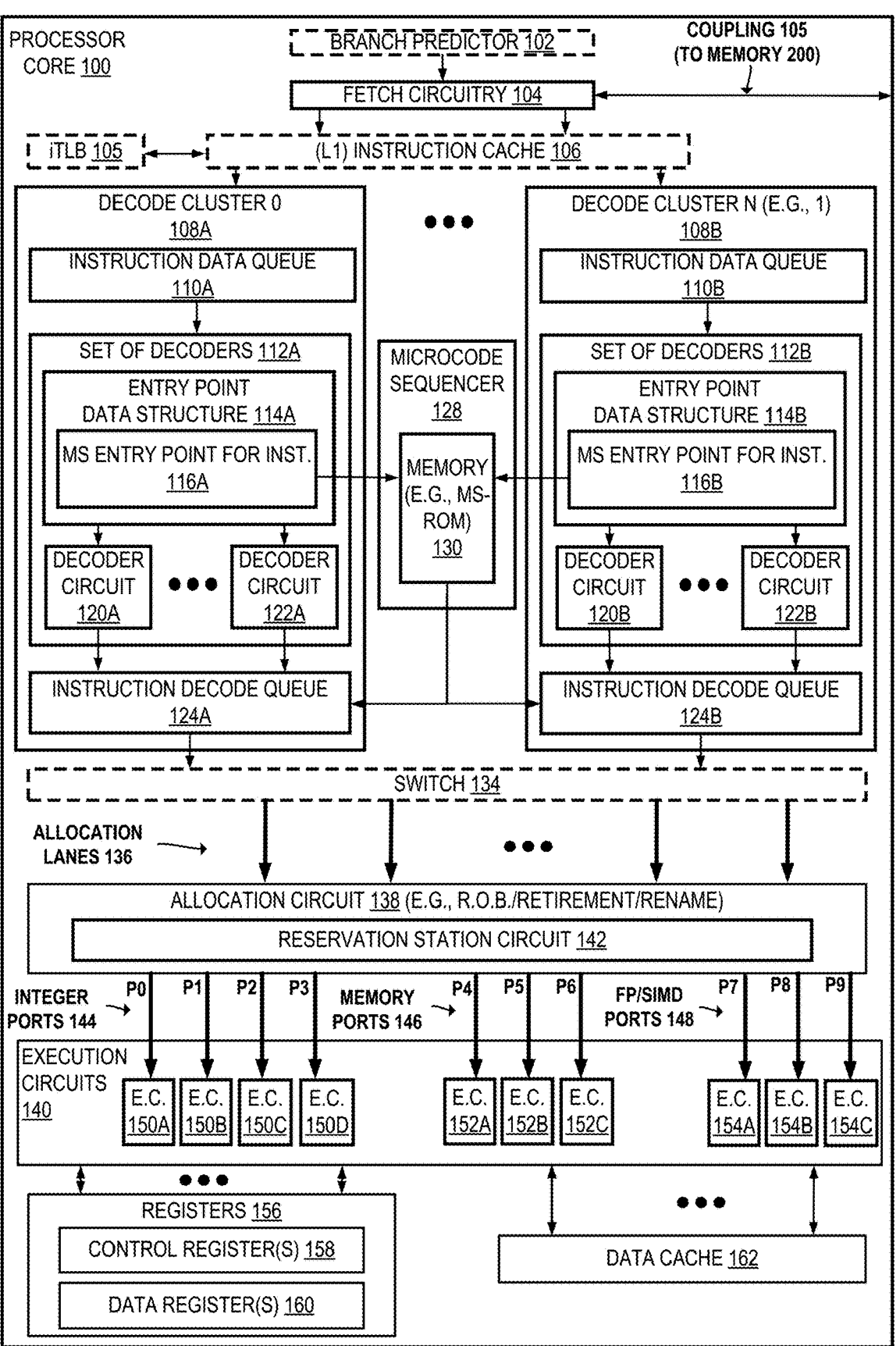
FIG. 1 illustrates a processor core having fetch circuitry that implements variable width unaligned fetch according to some examples.

The present disclosure relates to methods, apparatus, systems, and non-transitory computer-readable storage media for implementing a variable width and unaligned fetch in a processor.

A (e.g., hardware) processor (e.g., having one or more cores) may execute (e.g., user-level) instructions (e.g., a thread of instructions) to operate on data, for example, to perform arithmetic, logic, or other functions. For example, software may include a plurality of instructions (e.g., macro-instructions) that are provided to a processor (e.g., a core or cores thereof) that then executes (e.g., decodes and executes) the plurality of instructions to perform the corresponding operations. In certain examples, a processor includes circuitry (e.g., one or more decoder circuits) to translate (e.g., decode) an instruction into one or more micro-operations (pops or micro-ops), for example, with these micro-operations directly executed by the hardware (e.g., by execution circuits). One or more micro-operations corresponding to an instruction (e.g., macro-instruction) may be referred to as a microcode flow for that instruction. A micro-operation may be referred to as a micro-instruction, for example, a micro-instruction that resulted from a processor's decoding of a macro-instruction. In one example, the instructions are 64 bit and/or 32 bit instructions of an instruction set architecture (ISA). In one example, the instructions are (e.g., 64 bit and/or 32 bit) instructions of an Intel® instruction set architecture (ISA).

According to some examples, a processor is to access instructions from a memory (e.g., a memory separate from the processor) that is to store a plurality of instructions (e.g., storing the instructions as (e.g., raw) instruction data), and fetch circuitry of a processor is to fetch the instruction data (e.g., fetch the raw instruction data), e.g., to fetch (e.g., raw) instruction data at a granularity of a cache line. In certain examples, the processor is to then analyze the instruction data to identify one or more instructions that are contained therein, e.g., as certain ISAs are to implement a variable instruction length (e.g., where each instruction has a bit width of between 1 and 15 Bytes). In certain examples, the processor is to then decode the one or more identified instructions, e.g., as discussed herein.

In certain examples, memory is divided into separate blocks (e.g., one or more cache lines), for example, with each block managed as a single unit for coherence purposes. In certain examples, a (e.g., each) cache line is 64 Bytes in width.

In certain examples, the fetch width of the front end (e.g., including the fetch circuitry, decoder, branch predictor, instruction cache, and/or instruction translation lookaside buffer (iTLB)) of the processor (e.g., central processing unit) determines how much instruction data can be looked at in a single cycle, e.g., with that instruction data used to determine branch predictions, iTLB translations, and/or what cache lines need to be requested (e.g., from a memory storing the instructions) if not present. In certain examples, an instruction within the fetched instruction data refers to other instruction(s) (e.g., via their instruction pointer (IP)), for example, where a branch instruction within the fetched instruction data refers to another instruction, e.g., (i) an unconditional branch, which always results in branching to another instruction, or (ii) a conditional branch, which may or may not cause branching to another instruction depending on some condition(s). In certain examples, an instruction pointer is a 32-bit wide IP (e.g., "EIP") or 64-bit wide IP (e.g., RIP). In certain examples, the other instruction(s) referred to (e.g., via their IP) by an instruction(s) in the fetched instruction data are checked (i) in an instruction cache (e.g., storing the instruction data that is looked up by its corresponding instruction pointer) and/or (ii) an iTLB (e.g., storing a linear (or virtual) address to physical address mapping for instruction data), e.g., before requesting a fetch of instruction data including the other instruction(s) referred to (e.g., via their IP) by the instruction(s) in the fetched instruction data However, there are limitations on the maximum fetch size (e.g., per fetch operation) due to architectural constraints such as boundaries between memory pages (e.g., code pages) and cache lines, that require hardware and restrictions to overcome. In certain examples, the larger the fetch width (e.g., per fetch operation), the faster the fetch circuitry can find the next taken branch, iTLB miss, and/or instruction cache miss, e.g., to start a resteering of code execution and/or a memory request earlier. In certain examples, fetch circuitry (e.g., according to their fetch algorithm) aligns fetches such that certain fetches retrieve few bytes if the fetch starts towards the end of an aligned fetch region, see, e.g., FIG. 2A.

In certain examples, fetch circuitry (e.g., according to their fetch algorithm) aligns fetches on a maximum cache line aligned access basis, e.g., such that for a two 64-Byte cache line aligned access fetch width, each corresponding address starts with the lowest seven bits (e.g., indexed as bits 6-0) all zero (e.g., because for a 64-Byte cache line, the corresponding address starts with the lowest six bits (e.g., indexed as bits 5-0) all zero). In certain examples, fetch circuitry determines a cache line of an address (e.g., instruction pointer) by masking out its lowest (e.g., seven) bits, and fetching the cache line. As discussed herein, a cache line of fetched (e.g., raw) instruction data may include multiple instructions, e.g., instructions that have a variable instruction length (e.g., where each instruction has a bit width of between 1 and 15 Bytes). See FIGS. 2A-2B for a further discussion of aligned and unaligned accesses. In certain examples, an "aligned" fetch is aligned to a certain (e.g., 128 byte) boundary (or the max width of the fetch). In certain examples, an "unaligned fetch" allows fetching over the certain (e.g., 128 byte) boundary (or max width of the fetch), but it is still "aligned" to cache line (e.g., 64 byte) regions.

In certain examples, fetch circuitry keeps the maximum fetch size at a single cache line boundary, so that a single fetch will never cross a page boundary or lookup multiple cache lines. The problem with this is that keeping the fetch width to the size of a single cache line limits the performance of the processor, for example, aligning the fetch to single cache line boundaries that avoid these cases can cause some fetches to actually fetch very little data, e.g., if they start just before the alignment endpoint, the size is limited. In certain examples, a processor having such fetch circuitry has decoupled (i) iTLB and (ii) instruction cache lookups from branch prediction so that branches can be predicted at a greater rate than the cache can be looked up. The problem with decoupling branch prediction is that it increases speculation while not increasing the speed at which cache misses are found.

To overcome these problems, examples herein are directed to fetch circuitry that implements a variable width unaligned fetch. In certain examples, a fetch from this fetch circuitry can cover its maximum width in most cases, but when approaching a boundary such as the end of a page, the width of the fetch can shrink to avoid crossing the page boundary within a single fetch. Examples herein have the advantage of increasing the fetch width to increase processor performance, the unaligned fetches increase the average and minimum fetch size, and the variable width handles edge cases without requiring extra hardware and complexity to support multiple page lookups at once.

FIG. 1 illustrates a processor core having fetch circuitry 104 that implements variable width unaligned fetch according to some examples. In certain examples, the processor core 100 includes a coupling 105 to a memory that stores instruction data, e.g., memory 200 in other figures. In certain examples, processor core 100 includes a (e.g., level one) instruction cache 106, e.g., to cache one or more instructions without having to load them from memory. In certain examples, processor core 100 includes an instruction translation-lookaside-buffer 105 (iTLB), e.g., to store linear (or virtual) address to physical address mappings for instructions. In certain examples, coupling 105 couples fetch circuitry 104 to a memory via a memory subsystem. In certain examples, coupling 105 is through iTLB 105 and/or instruction cache 106. In certain examples, memory 200 is an instance of storage 928, memory 932, and/or memory 934 in FIG. 9.

In certain examples, fetch circuitry 104 performs (e.g., in response to a request from branch predictor 102) a single fetch operation via coupling 105 to fetch from a paged memory: a multiple cache line width of instruction data, between (e.g., and including) a minimum width (e.g., 65-Bytes) that is greater than one cache line and a maximum width (e.g., 128-Bytes) that is a plurality of cache lines, in response to determining the multiple cache line width of the instruction data does not include a page boundary of the paged memory, and less than or equal to one cache line width of the instruction data when the multiple cache line width of the instruction data does include the page boundary of the paged memory. In certain examples, a page boundary is determined based on (e.g., the fetch circuitry 104) reading a control register 158 that indicates the granularity of memory pages, e.g., of any preset value (e.g., 4 kilobytes (KB) (or 4096 KB), 2 megabytes (MB), 4 MB, 32 MB, 256 MB, 512 MB, or 1 gigabyte (GB)). For example, where a certain page size flag being set (e.g., a PDPE1 GB flag) in a control register 158 indicates a corresponding page granularity (e.g., 1 GB for the PDPE1 GB flag) is selected. In certain examples, the fetch circuitry 104 is to compare the range of addresses in a plurality of cache lines that are to be fetched and if that crosses a page boundary, then the boundary crossing portion is to not be fetched (e.g., only a single cache line is to be fetched). For example, where the fetch circuitry 104 is to fetch instruction data having a two "64-Byte cache line aligned access" fetch width, if certain upper bits (e.g., bits 21-13 (e.g., indexed as bits 20-12)) of the address changes (e.g., if at least bit 12 changes), then a page boundary is encountered when in 4 KB page granularity.

In certain examples, the fetch circuitry 104 is switchable between different fetch modes, e.g., via setting a corresponding bit(s) in control register 158. In certain examples, (i) when the fetch circuitry 104 is in a first mode, the multiple cache line width of the instruction data, between the minimum width that is greater than one cache line and the maximum width that is the plurality of cache lines, is fetched (e.g., in a single fetch operation) when the multiple cache line width of the instruction data does not include the page boundary of the paged memory, and less than or equal to one cache line width of the instruction data when the multiple cache line width of the instruction data does include the page boundary of the paged memory, and (ii) when i the fetch circuitry 104 is in a second mode, only less than or equal to one cache line width of the instruction data is fetched (e.g., in a single fetch operation).

Processor core 100 may be one of a plurality of cores of a processor, e.g., of a system. Processor core 100 may include a branch predictor 102 (e.g., to predict one or more branches of the code (e.g., instructions) that are to be executed by the processor core 100. In certain examples, the branch predictor 102 (e.g., branch predictor circuit) learns from past behavior of branches to predict a next (e.g., incoming) branch. In certain examples, the branch predictor 102 predicts a proper subset of (e.g., contiguous in the original program order) instructions as a block of code (e.g., ending in a branch instruction). As one example, processor core 100 may receive code to execute and, in response, may divide the code into blocks.

In certain examples, the processor core 100 (e.g., via the fetch circuit 104 and/or branch predictor 102) may send the blocks of instructions to a decode cluster, for example, with a first block of instructions sent to decode cluster 0 108A, a (next in program order, e.g., younger) second block of instructions sent to decode cluster N 108B, etc. In a two-cluster example, a third (next in program order, e.g., younger) block of instructions may be sent to the next available decode cluster (e.g., after it has finished decode of its current block of instructions). In a two-cluster example, a third (next in program order, e.g., younger) block of instructions may be sent to the next decode cluster (e.g., to decoder cluster 108A in this example). Although two decode clusters 108A-108B are shown, it should be understood that three or more clusters may be utilized (e.g., where "N" is a positive integer greater than one).

In certain examples, each decode cluster includes two or more (e.g., superscalar x86) instruction decoders capable of decoding different basic blocks of code out-of-order with respect to each other, for example, with decode cluster 108A including a first decoder circuit 120A (e.g., decoder) and a second decoder circuit 122A (e.g., decoder), and decode cluster 108B including a second decoder circuit 120B (e.g., decoder) and a second decoder circuit 122B (e.g., decoder).

In certain examples, the branch predictor 102 of the processor core 100 divides code into individual blocks (e.g., of a set of contiguous instructions from the program). In certain examples, the fetch circuit 104 of the processor core 100 divides code into individual blocks (e.g., of a set of contiguous instructions from the program). The individual code blocks may then be sent to their respective decode cluster for decoding, for example, to a respective instruction data queue (e.g., instruction data queue 110A as an input queue for decode cluster 108A and instruction data queue 110B as an input queue for decode cluster 108B).

In certain examples, fetch circuit 104 sends code blocks to their respective decode cluster via instruction cache 106. Instruction cache 106 may include an instruction cache tag and/or instruction translation lookaside buffer (iTLB) 105. In certain examples, once the code blocks are sent to their corresponding decode cluster 108A-108B, each decode cluster begins decoding the code blocks in parallel (e.g., via the parallel decoder circuits therein). In certain examples, decode clusters operate independently of each other, so the blocks of code can be decoded out-of-order (e.g., out of program order).

In certain examples, the allocation circuit 138 is responsible for allocating the operations (e.g., micro-operations) to the execution circuits 140 (e.g., execution units), e.g., in the proper program order. The allocation circuit 138 may perform retirement and/or renaming, e.g., as well as including a re-order buffer (ROB) for reordering any out-of-order instruction (e.g., micro-operation) execution. In certain examples, processor core 100 includes a reservation station circuit 142 to cause a micro-operation to be sent (e.g., dispatched) to execution circuits 140 when that micro-operation is ready for execution, e.g., source operand(s) are available. In certain examples, reservation station circuit 142 includes a plurality of reservation station entries, e.g., one for each micro-operation awaiting execution.

Processor core depicts a first decode cluster 108A with a plurality of decoder circuits 120A-122A in a first set 112A and a second decode cluster 108B with a plurality of decoder circuits 120B-122B in a second set 112B. In certain examples, a (e.g., each) decoder circuit (120A, 122A, 120B, 122B) is to decode a (e.g., macro) instruction into a set of one or more micro-operations that are to be executed (e.g., as a primitive) by an execution circuit(s) 140. In certain examples, a decoder circuit (120A, 122A, 120B, 122B) is to decode certain (e.g., macro) instructions into a corresponding set of one or more micro-operations without utilizing a microcode sequencer 128 (e.g., a microcode sequencer separate from any decode cluster and/or decoder circuit) and/or decode other (e.g., macro) instructions (e.g., complex instruction set computer (CISC) instructions) into a corresponding set of one or more micro-operations by utilizing the microcode sequencer 128 (e.g., the microcode sequencer separate from any decode cluster and/or decoder circuit). In one example, a decoder circuit (120A, 122A, 120B, 122B) is to output a certain number of micro-operation per cycle (e.g., one micro-operation per cycle and/or between one and four micro-operations per cycle). In certain examples, a "micro-coded" instruction generally refers to an instruction where a decode cluster (e.g., set of decoders) requests the microcode sequencer 128 to load the corresponding set of one or more (e.g., plurality of) micro-operations (pops) from the microcode sequencer memory 130 (e.g., read-only memory (ROM)) into the decode pipeline (e.g., into the corresponding instruction decode queue), e.g., instead of producing that instruction's set of one or more micro-operations directly by a decoder circuit. For example, to implement some (e.g., complex) (e.g., x86) instructions, a microcode sequencer 128 is used to divide the instruction into a sequence of smaller (e.g., micro) operations (also referred to as micro-ops or pops).

In certain examples, each decode cluster (e.g., each decoder circuit in some examples) includes a data structure to store a corresponding entry point value (e.g., address) for one or more instructions into memory 130 of microcode sequencer 128 and/or a number of bits (e.g., the number of cycles to generate the corresponding micro-operations for an instruction and/or the number of micro-operations for the instruction). For example, (1) with data structure 114A of decode cluster 108A including one or more entries that each indicate (e.g., for a single instruction), an entry point 116A for an instruction and/or bits (e.g., a coded value) for the instruction and/or (2) with data structure 114B of decode cluster 108B including one or more entries that each indicate (e.g., for a single instruction), an entry point 116B for an instruction and/or bits (e.g., coded value) for the instruction. In certain examples, data structure 114A and data structure 114B are copies of each other, e.g., they include the same data. In one example, data structure 114A and data structure 114B are loaded with their data at manufacturing time. In one example, data structure 114A and data structure 114B are loaded with their data during processor boot, e.g., by executing Basic Input/Output System (BIOS) firmware or Unified Extensible Firmware Interface (UEFI) firmware.

After decoding of an instruction into its respective micro-operations (e.g., by decoder circuits or microcode sequencer), in certain examples they are stored in an instruction decode queue. In FIG. 1 (e.g., at the end of the decode stage), decode cluster 108A includes instruction decode queue 124A (e.g., instruction queue) that receives respective micro-operations from decoder circuits 120A-122A and from microcode sequencer 128 (e.g., when decode cluster 108A is arbitrated access to memory 130) and decode cluster 108B includes instruction decode queue 124B (e.g., instruction queue) that receives respective micro-operations from decoder circuits 120B-122B and from microcode sequencer 128 (e.g., when decode cluster 108B is arbitrated access to memory 130).

Optionally, switch 134 is included to couple output(s) of instruction decode queues 124A-124B to allocation lanes 136 (e.g., input(s)) of allocation circuit 138. In certain examples, allocation circuit 138 is to send micro-operations from the instruction decode queues 124A-124B (e.g., in or out of program order) to an execution circuit of execution circuits 140 (e.g., via reservation station circuit 142). In certain examples, processor core 100 includes a reservation station circuit 142 to cause a micro-operation to be sent (e.g., dispatched) to execution circuits 140 when that micro-operation is ready for execution, e.g., source operand(s) are available. In certain examples, reservation station circuit 142 includes a plurality of reservation station entries, e.g., one for each micro-operation awaiting execution.

Certain execution circuits 140 (e.g., memory execution circuits 150A-154C) may access storage, e.g., registers 156 and/or data cache 162 (e.g., one or more levels of a cache hierarchy). Once the resultants are generated by the execution circuits 140, a retirement circuit (e.g., within allocation circuit 138) may then retire a corresponding instruction.

The plurality of execution circuits 140 may include a plurality of different types of execution circuits, for example, integer type of execution circuit(s), memory type of execution circuit(s), floating point type of execution circuit(s), single instruction, multiple data (SIMD) (e.g., vector) type of execution circuit(s), or any combination thereof. Execution circuits 140 may include (i) a set of one or more integer type of execution circuits 150A, 150B, 150C, and 150D having corresponding integer ports 144 (labeled ports P0, P1, P2, and P3, respectively) (although shown as having four ports and four corresponding execution circuits of this type, any single or plurality may be utilized in certain examples), (ii) a set of one or more memory type of execution circuits 152A, 152B, and 152C, having corresponding memory ports 146 (labeled ports P4, P5, and P6, respectively) (although shown as having three ports and three corresponding execution circuits of this type, any single or plurality may be utilized in certain examples), and/or (iii) a set of one or more floating point type and/or SIMD type of execution circuits 154A, 154B, and 154C having corresponding floating point/SIMD ports 148 (labeled ports P7, P8, and P9, respectively) (although shown as having three ports and three corresponding execution circuits of this type, any single or plurality may be utilized in certain examples).

Operations to be executed (e.g., micro-operations from decoder circuits 120A-122A and/or decoder circuits 120B-122B) may be sent from allocation lanes 136 (for example, which may be any plurality, e.g., greater than the number of ports, equal to the number of ports, and/or less than the number or ports) to execution circuits 140 via ports 144, 146, and/or 148. In certain examples, the number of allocation lanes is referred to as the allocation width, e.g., the number of micro-operations which can be allocated (e.g., from instruction decode queue 124A and/or instruction decode queue 124B).

In certain examples, allocation circuit 138 is included to allocate the execution circuits 140 for the incoming micro-operations on allocation lanes 136. In certain examples, a reservation station circuit 142 is included to dispatch micro-operations when they are ready for execution, e.g., by sending the micro-operation on one or more issue (or dispatch) ports of the reservation station circuit 142 to a corresponding execution circuit of execution circuits 140. In one example, a reservation station circuit 142 checks if the operand(s) for a micro-operation (e.g., as indicated in its reservation station entry) are available and if the corresponding execution circuit is available (e.g., free for use), and dispatches the micro-operation for execution in response to the operand(s) being available and the corresponding execution circuit being available. In certain examples, a processor utilizes register renaming to abstract a logical register from a physical register, e.g., with those logical register(s) utilized by reservation station (e.g., scheduler) circuit.

In certain examples, registers 156 includes one or more control registers 158 and/or one or more data registers 160 (e.g., a general-purpose data register). In one example, the control register 158 includes a field (e.g., a single bit wide) to control fetching according to this disclosure (e.g., to switch between the first mode and the second mode of fetching discussed herein).

Figure 2B:
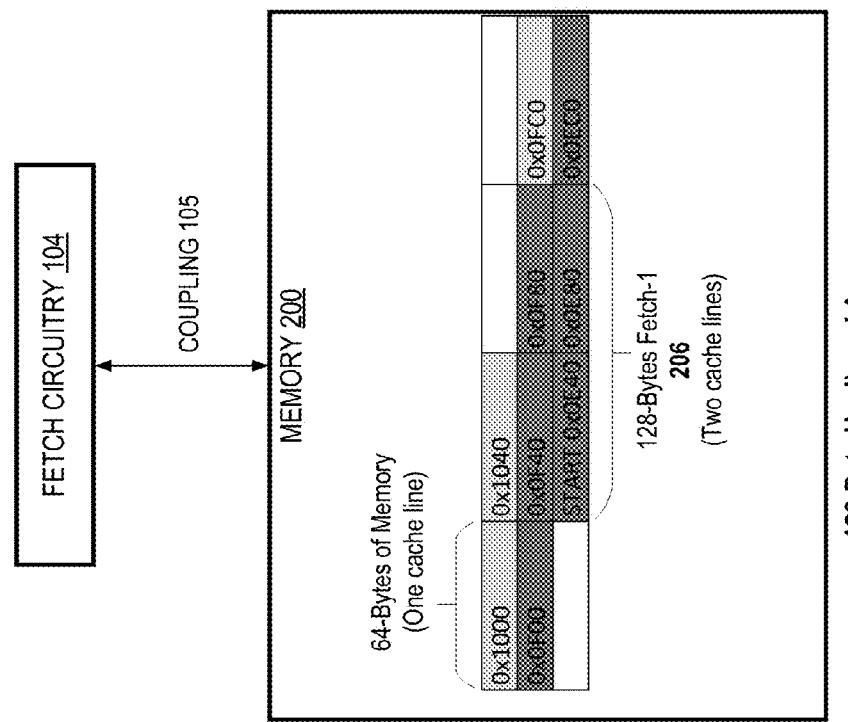
FIG. 2B illustrates fetch circuitry that implements variable width up to 128 Byte unaligned fetch according to some examples.
Figure 2A:
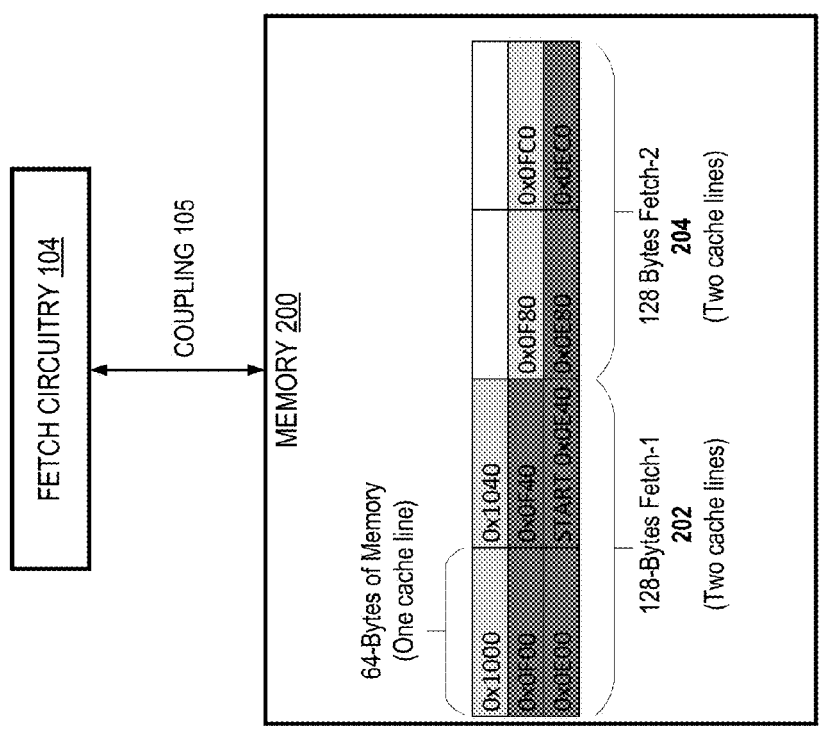
FIG. 2A illustrates fetch circuitry that implements 128 Byte aligned fetch according to some examples.

FIG. 2A illustrates fetch circuitry 104 that implements 128 Byte aligned fetch according to some examples. In FIG. 2A, each block (shown as a cell of a table) of instruction data (e.g., instructions and not data to be operated on) is a single cache line (64-Bytes wide) and each fetch by fetch circuitry 104 fetches two cache lines (128-Bytes total) of instruction data (e.g., instructions and not data to be operated on) from memory 200 (e.g., system memory) for 128-Byte aligned accesses. In FIG. 2A, for a 128 Byte aligned fetch, each corresponding address for the instruction data starts with the lowest seven bits (e.g., indexed as bits 6-0) all zero and so a fetch that has an address (in hexadecimal) of 0xE40, this is to cause a fetch of the two cache lines 202 that begin at address 0x0E00. An issue with this is that an instruction beginning (but not ending) within the second of those two cache lines 202 and/or an instruction referred to (e.g., a branch target) within the second of those two cache lines 202 is not fetched in this fetch operation. In certain examples, this means that those instruction beginning (but not ending) within the second of those two cache lines 202 and/or an instruction referred to (e.g., a branch target) within the second of those two cache lines 202 is to be fetched in a second fetch operation of the two cache lines 204.

FIG. 2B illustrates fetch circuitry 104 that implements variable width up to 128 Byte unaligned fetch according to some examples. In certain examples, fetch circuitry 104 implements variable width unaligned fetch as a performance feature to increase the fetch bandwidth of the processor core 100. In certain examples, fetch circuitry 104 has a maximum 128-Byte fetch width that is unaligned in respect to which cache line can come first (e.g., is not limited to having the lowest seven bits (e.g., indexed as bits 6-0) of the address all zero). In certain examples, fetch circuitry 104 performs a variable width fetch operation from memory 200 (e.g., system memory) that is aligned to a 64-Byte cache line (e.g., the corresponding address starts with the lowest six bits (e.g., indexed as bits 5-0) all zero), e.g., resulting in typical fetch widths between 65-Bytes and 128-Bytes depending on the start point of the fetch within the first cache line. In certain examples, if the start point of the fetch from memory 200 (e.g., system memory) is within the last cache line of a page (e.g., 4 Kilobyte region), then the maximum width of that fetch is reduced to 64 Bytes, e.g., with the subsequent fetch starting on the new page. In certain examples, this feature means that there is no need to add hardware to handle multiple iTLB lookups in a single cycle.

Referring to the example from FIG. 2A, FIG. 2B illustrates that with the variable width up to 128 Byte unaligned fetch disclosed herein, a fetch that has an address (in hexadecimal) of 0x0E40, is to instead cause an "unaligned" fetch of the two cache lines 206 that begin at address 0x0E40, and thus fetches instruction data from 0x0E80 cache line, e.g., which in certain cases includes the rest of the instruction that began in the 0xE40 cache line and/or the instruction(s) referred to (e.g., a branch target) by an instruction in the 0xE40 cache line. In certain examples, cache lines of the same color are part of a single fetch, e.g., cache line 0x0EC0 and cache line 0x0F00 are both shown as blue because those two cache lines are part of the same fetch/branch predictor lookup with the unaligned scheme. In certain examples, the cache line 0x0FC0 is a single cache line fetch because it would cross the page crossing boundary (e.g., 4K memory address space crossing) if multiple cache lines (shown as the only box in FIG. 2B having the yellow color).

Figure 3:
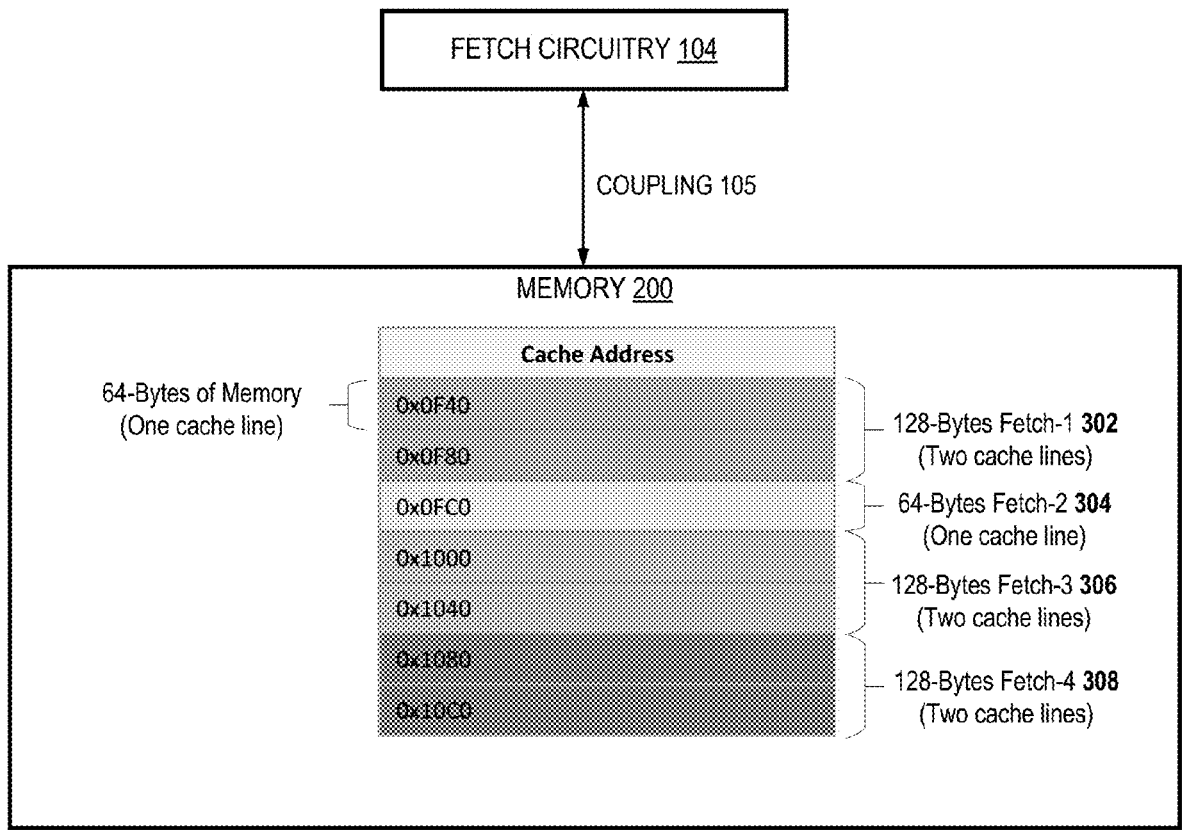
FIG. 3 illustrates fetch circuitry that implements variable width 64 Byte and 128 Byte unaligned fetch according to some examples.

FIG. 3 illustrates fetch circuitry 104 that implements variable width 64 Byte and 128 Byte unaligned fetch according to some examples. FIG. 3 shows how the fetch width from memory 200 (e.g., system memory) changes as the unaligned fetches read a page boundary. In FIG. 3, fetch 1 302 is a 128 Byte fetch from 0x0F40 to 0x0FBF, fetch 2 304 starts at 0x0FC0, but if it were to be a full 128 bytes it would cross the page boundary, and thus the fetch circuitry detects this and in response reduces the fetch width to 64 bytes, i.e., 0x0FC0 to 0x0FFF. Then in FIG. 3, fetch 3 306 and fetch 4 308 are each 128 Byte fetches on the new page in the subsequent two cycles, respectively. In certain examples, a fetch from starting address (e.g., instruction pointer) 0x0F7F at fetch 1 302 is to fetch 65-Bytes of data (e.g., where the fetch circuit is to not receive data from before that starting address).

FIG. 4A illustrates fetched raw instruction data 400 (e.g., to be stored in fetch circuitry 104, e.g., a buffer thereof) from a 128 Byte aligned fetch according to some examples. FIG. 4B illustrates fetched raw instruction data 400 from a variable width up to 128 Byte unaligned fetch according to some examples. The CLIP is current linear instruction pointer, and the branch shows the branch instruction address with an arrow indicating the branch's target (e.g., where it is to jump to). Thus, as compared to FIG. 4A, fetch circuitry that implements variable width (64 Byte up to 128 Byte) unaligned fetches to fetch data 400 in FIG. 4B improves processor performance because the unaligned fetch is able to retrieve the same set of (e.g., usable) bytes and/or branch prediction information for that region in a smaller number of fetches. In certain examples, the raw instruction data 400 fetched is cache data bytes. While retrieving the bytes is one implementation, there are other implementations where the actual raw instruction cache data bytes are not fetched, e.g., but the prediction lookups are done for those bytes (for example, where branch prediction data is not referred to in bytes, e.g., the branch prediction data is a non-contiguous set of bits used as input for a branch predictor) to allow the finding of the next branches, targets, iTLB misses, instruction cache (I$) misses, etc. earlier without actually retrieving the raw bytes of data for that region. In certain examples, the raw instruction data 400 is such data associated with a fetch (e.g., such as branch prediction data), e.g., but not the actual cache data bytes.

In certain examples, fetch circuitry that implements variable width (e.g., 64 Byte up to 128 Byte) unaligned fetches can also be used for debug and/or functional workarounds if desired, e.g., where the fetches can be reduced in width conditionally or permanently as needed. This functionality can be used to resolve a functional bug with minimal performance loss.

Figure 5:
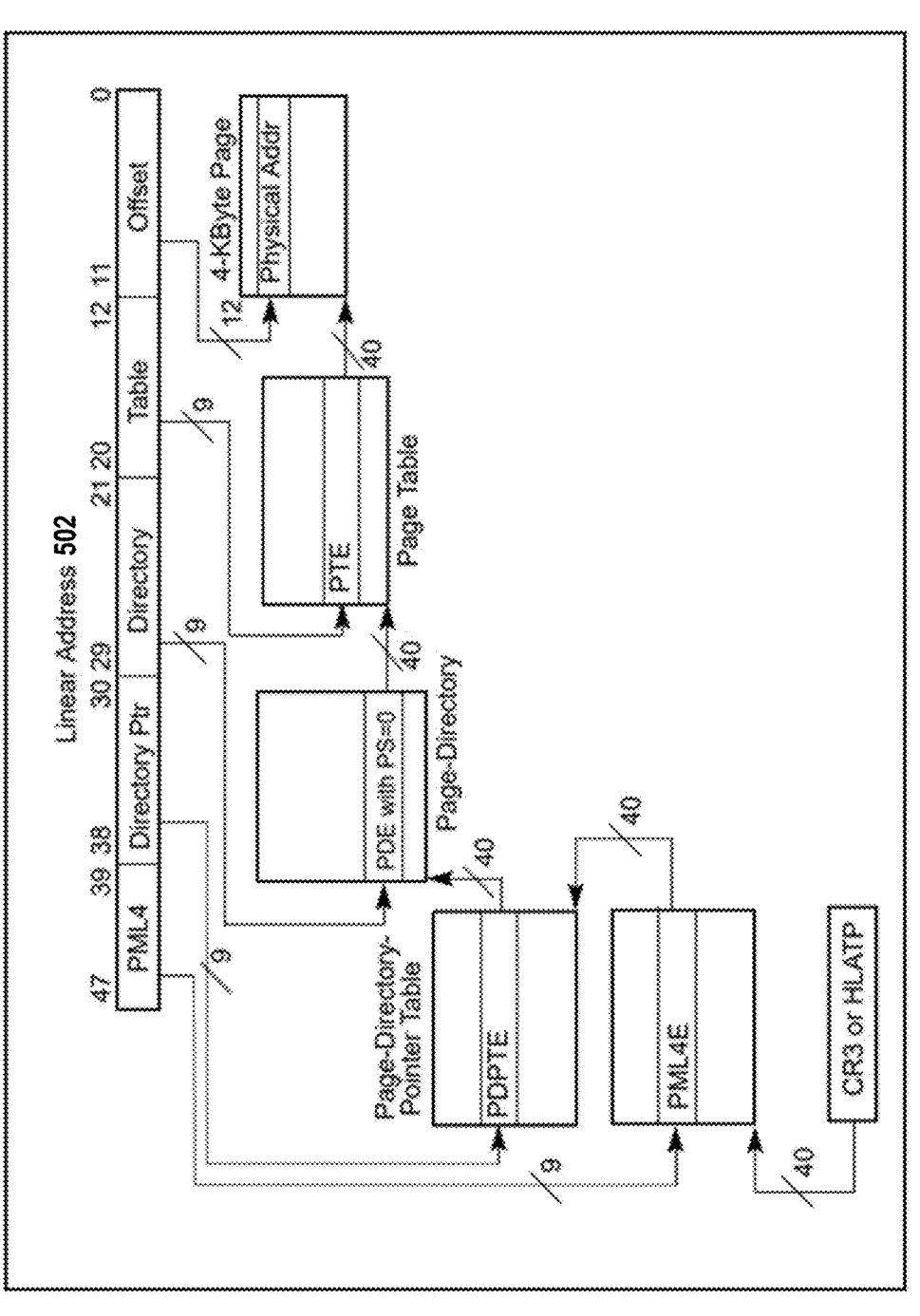
FIG. 5 illustrates a linear-address translation to a 4K Byte page using 4-level paging according to some examples.

FIG. 5 illustrates a linear-address translation 500 to a 4K Byte page using 4-level paging according to some examples. FIG. 5 illustrates an example where the offset bits indexed 11-0 of linear address 502 are memory locations within a single page, and the page address begins at (table) bits 12 and more of linear address 502. In certain examples, multiple (e.g., 4-level, 5-level, etc.) paging memory translates a linear address using a hierarchy of in-memory paging structures (e.g., located using the contents of a control register (e.g., CR3) which is used to locate the first paging structure). In certain examples, for 4-level paging, this is a PML4 table.

Figure 6:
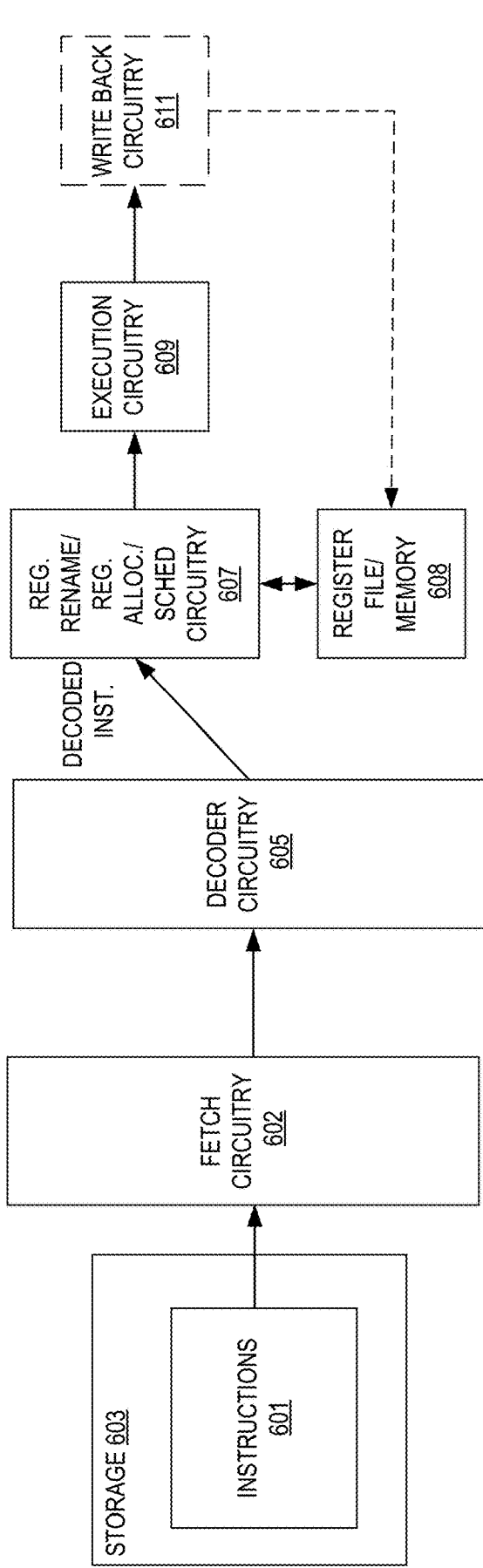
FIG. 6 illustrates examples of computing hardware, including fetch circuitry, to process an instruction.

FIG. 6 illustrates examples of computing hardware, including fetch circuitry 602 (e.g., as an instance of fetch circuitry 104) to process an instruction. The instruction may be an arithmetic or logical operation instruction. As illustrated, storage 603 (e.g., as an instance of memory 200) stores instructions 601 to be executed.

The instruction 601 is received by decoder circuitry 605. For example, the decoder circuitry 605 receives this instruction from fetch circuitry 602. The instruction may be in any suitable format, such as that describe with reference to FIG. 14 below. In an example, the instruction includes fields for an opcode, any source identifiers, and any destination identifier. In some examples, the sources and destination are registers, and in other examples one or more are memory locations. In some examples, one or more of the sources may be an immediate operand. In some examples, the opcode details the operations to be performed.

More detailed examples of at least one instruction format for the instruction will be detailed later. The decoder circuitry 605 decodes the instruction into one or more operations. In some examples, this decoding includes generating a plurality of micro-operations to be performed by execution circuitry (such as execution circuitry 609). The decoder circuitry 605 also decodes instruction prefixes.

In some examples, register renaming, register allocation, and/or scheduling circuitry 607 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 608 store data as operands of the instruction to be operated by execution circuitry 609. Example register types include packed data registers, general purpose registers (GPRs), and floating-point registers.

Execution circuitry 609 executes the decoded instruction. Example detailed execution circuitry includes execution circuitry 140 shown in FIG. 1, and execution cluster(s) 1160 shown in FIG. 11B, etc. The execution of the decoded instruction causes the execution circuitry to perform the desired operation(s).

In some examples, retirement/write back circuitry 611 architecturally commits the destination register into the registers or memory 608 and retires the instruction.

An example of a format for an instruction is OPCODE DST, SRC1, SRC2. In some examples, OPCODE is the opcode mnemonic of the instruction. DST is a field for the destination operand, such as packed data register or memory. SRC1 and SRC2 are fields for the source operands, such as packed data registers and/or memory.

Figure 7:
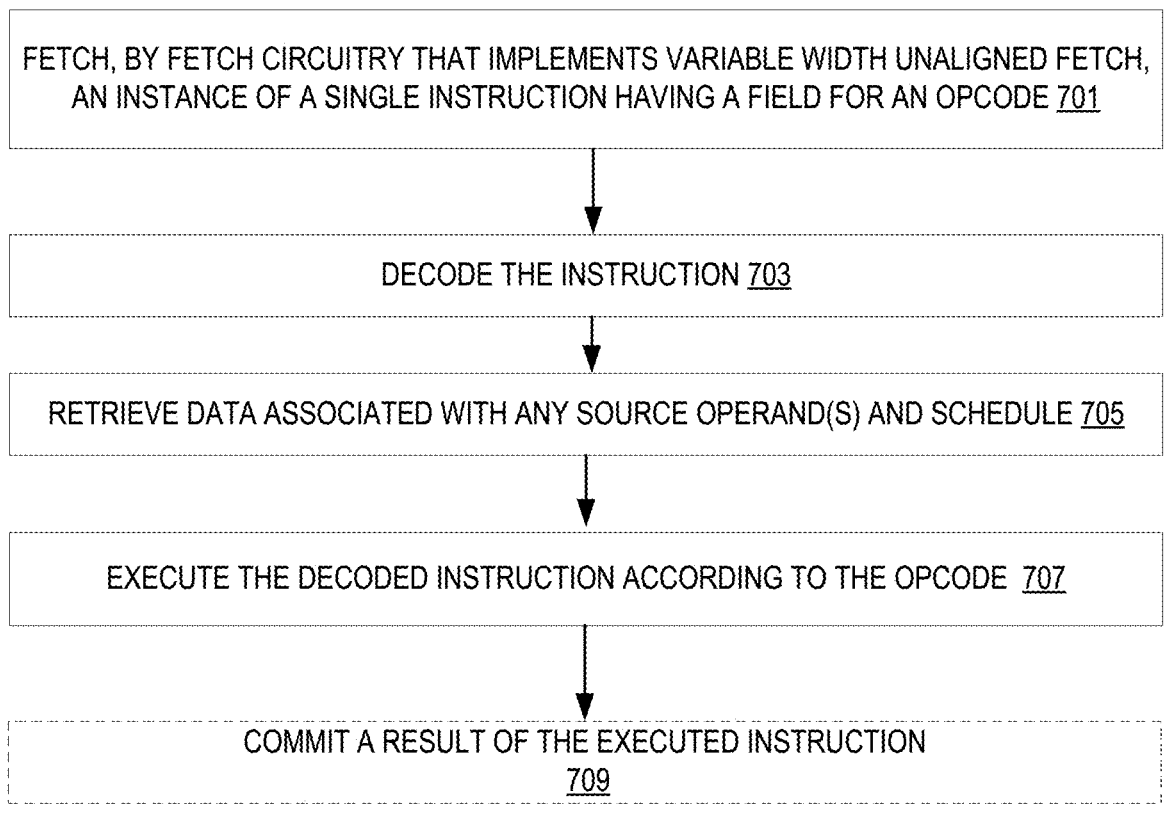
FIG. 7 illustrates an example method performed by a processor to process an instruction.

FIG. 7 illustrates an example method performed by a processor to process an instruction. For example, a processor core as shown in FIG. 11B, a pipeline as detailed below, etc., performs this method (including fetching according to this disclosure).

At 701, an instance of single instruction is fetched. The instruction includes fields for an opcode, sources, and/or destination. In some examples, the instruction further includes a field for a writemask. In some examples, the instruction is fetched from an instruction cache. The opcode indicates the operation(s) to perform.

The fetched instruction is decoded at 703. For example, the fetched instruction is decoded by decoder circuitry such as decoder circuitry 605 or decode circuitry 1140 detailed herein.

Data values associated with the source operands of the decoded instruction are retrieved when the decoded instruction is scheduled at 705. For example, when one or more of the source operands are memory operands, the data from the indicated memory location is retrieved.

At 707, the decoded instruction is executed by execution circuitry (hardware) such as execution circuitry 140 shown in FIG. 1, execution circuitry 609 shown in FIG. 6, or execution cluster(s) 1160 shown in FIG. 11B. For certain instructions, the execution will cause execution circuitry to perform the operations described by the opcode.

In some examples, the instruction is committed or retired at 709.

FIG. 8 illustrates an example method to process an instruction using emulation or binary translation. For example, a processor core as shown in FIG. 11B, a pipeline and/or emulation/translation layer perform aspects of this method.

An instance of a single instruction of a first instruction set architecture is fetched at 801 (e.g., fetched according to this disclosure). In certain examples, the instance of the single instruction of the first instruction set architecture includes fields for an opcode, sources, and/or destination. In some examples, the instruction further includes a field for a writemask. In some examples, the instruction is fetched from an instruction cache. The opcode indicates the operation(s) to perform.

Figure 20:
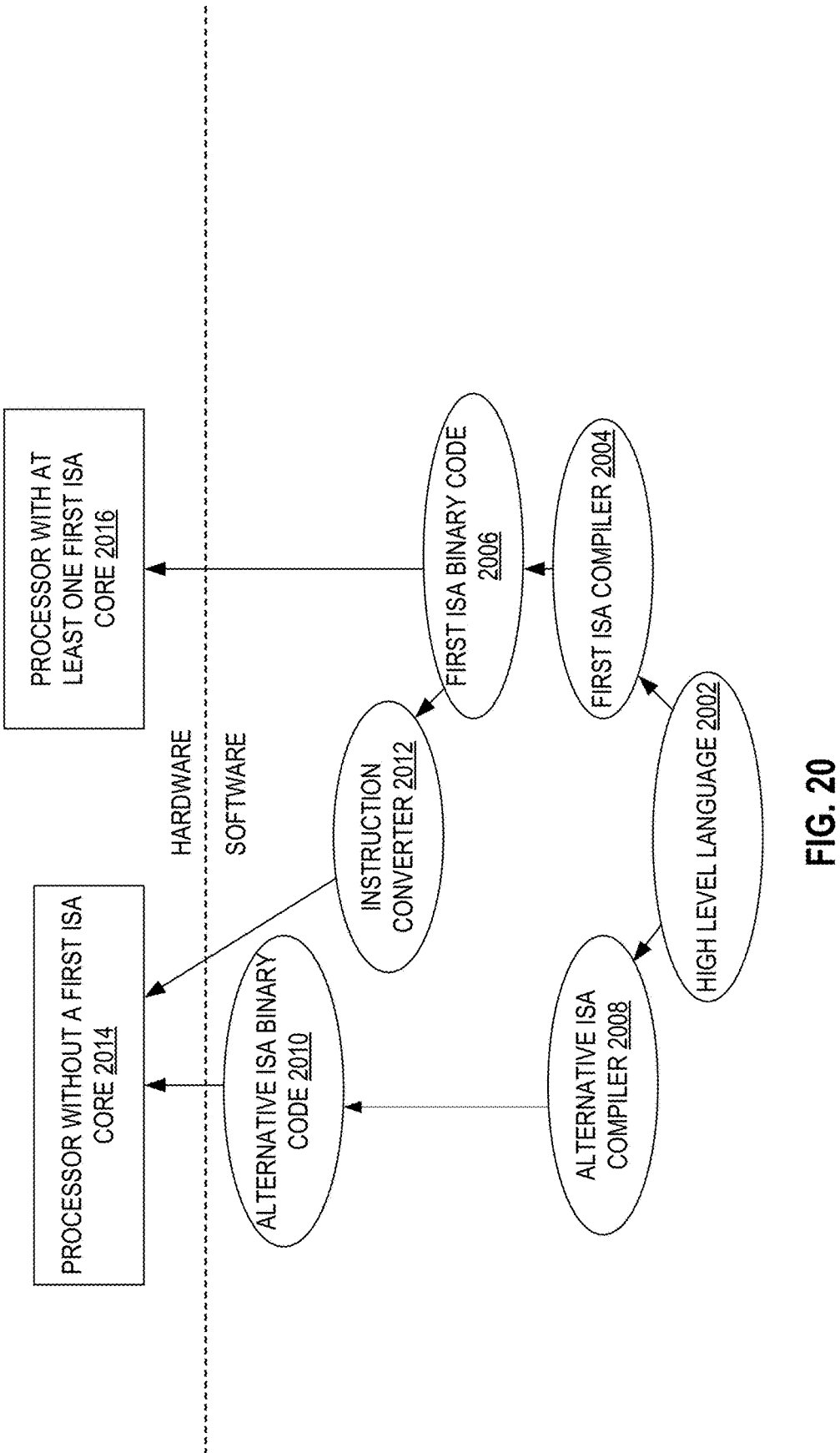
FIG. 20 is a block diagram illustrating the use of a software instruction converter to convert binary instructions in a source instruction set architecture to binary instructions in a target instruction set architecture according to examples.

The fetched single instruction of the first instruction set architecture is translated into one or more instructions of a second instruction set architecture at 802. This translation is performed by a translation and/or emulation layer of software in some examples. In some examples, this translation is performed by an instruction converter 2012 as shown in FIG. 20. In some examples, the translation is performed by hardware translation circuitry.

The one or more translated instructions of the second instruction set architecture are decoded at 803. For example, the translated instructions are decoded by decoder circuitry such as decoder circuitry 605 or decode circuitry 1140 detailed herein. In some examples, the operations of translation and decoding at 802 and 803 are merged.

Data values associated with the source operand(s) of the decoded one or more instructions of the second instruction set architecture are retrieved and the one or more instructions are scheduled at 805. For example, when one or more of the source operands are memory operands, the data from the indicated memory location is retrieved.

At 807, the decoded instruction(s) of the second instruction set architecture is/are executed by execution circuitry (hardware) such as execution circuitry 140 shown in FIG. 1, execution circuitry 609 shown in FIG. 6, or execution cluster(s) 1160 shown in FIG. 11B, to perform the operation(s) indicated by the opcode of the single instruction of the first instruction set architecture. For certain instructions, the execution will cause execution circuitry to perform the operations described in connection with the opcode.

In some examples, the instruction is committed or retired at 809.

Exemplary architectures, systems, etc. that the above may be used in are detailed below. For example, instruction fetch 1138 in FIG. 11B may include the functionality discussed herein (e.g., to implement variable width unaligned fetches).

At least some embodiments of the disclosed technologies can be described in view of the following examples:

Example 1. An apparatus comprising:

fetch circuitry to perform a single fetch operation to fetch from a paged memory:

a multiple cache line width of instruction data, between a minimum width that is greater than one cache line and a maximum width that is a plurality of cache lines, when the multiple cache line width of the instruction data does not include a page boundary of the paged memory, and less than or equal to one cache line width of the instruction data when the multiple cache line width of the instruction data does include the page boundary of the paged memory;

decoder circuitry to decode a single instruction, comprising an opcode, from the instruction data into a decoded instruction; and execution circuitry to execute the decoded instruction according to the opcode.

Example 2. The apparatus of example 1, wherein the fetch circuitry is to perform the single fetch operation in a single cycle of the apparatus.

Example 3. The apparatus of example 2, wherein the fetch circuitry is to not support multiple page lookups in a single cycle of the apparatus.

Example 4. The apparatus of example 1, wherein the fetch circuitry is to not support multiple page lookups in a single cycle of the apparatus.

Example 5. The apparatus of any one of examples 1-4, wherein the maximum width is two cache lines.

Example 6. The apparatus of example 5, wherein the two cache lines are 128 Bytes wide.

Example 7. The apparatus of example 6, wherein the minimum width is 65 Bytes.

Figure 9:
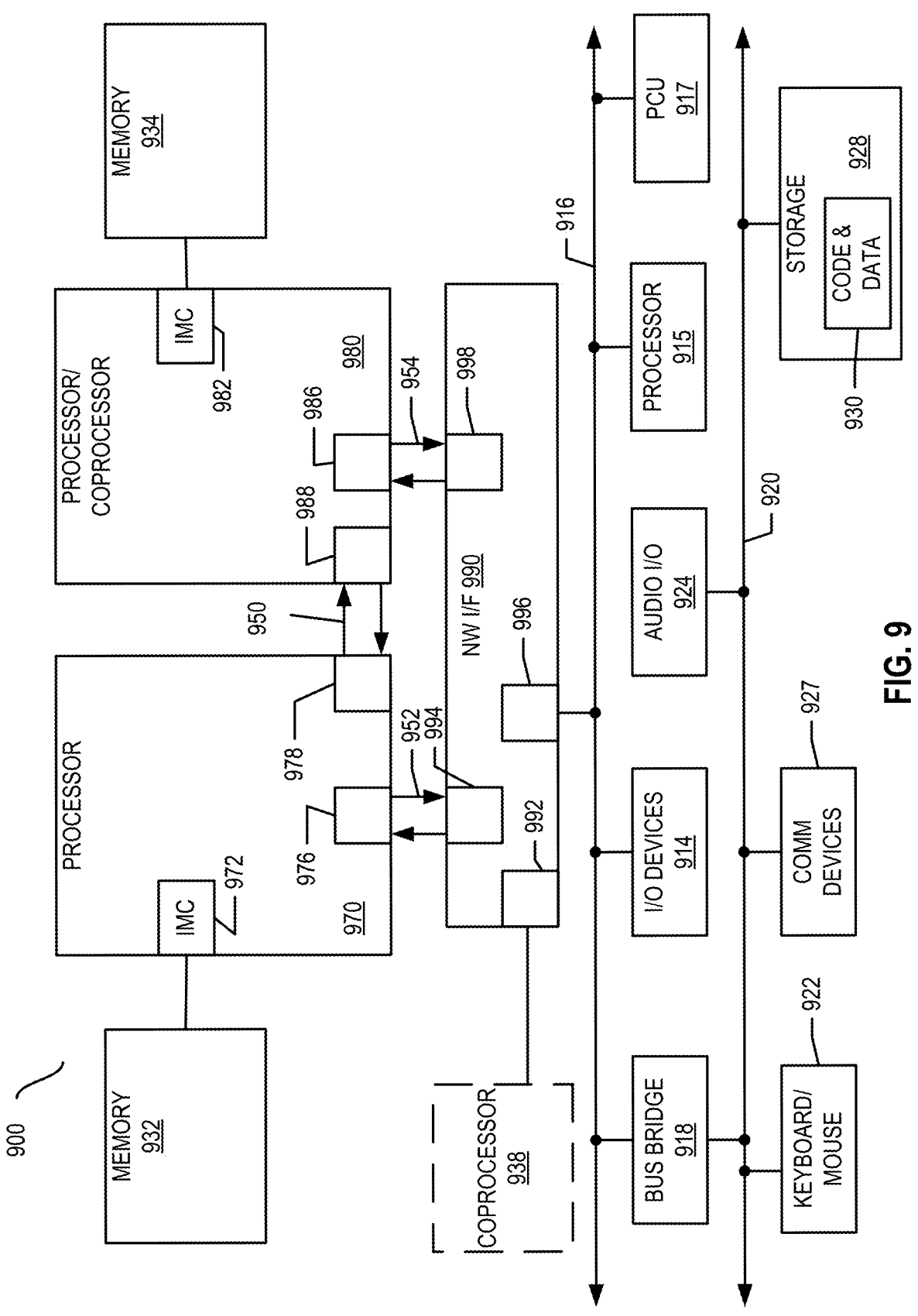
FIG. 9 illustrates an example computing system.

Example 8. The apparatus of any one of examples 1-7, wherein the fetch circuitry is to perform the single fetch operation to fetch from the paged memory:

when in a first mode, the multiple cache line width of the
instruction data, between the minimum width that is
greater than one cache line and the maximum width
that is the plurality of cache lines, when the multiple
cache line width of the instruction data does not include
the page boundary of the paged memory, and less than
or equal to one cache line width of the instruction data
when the multiple cache line width of the instruction
data does include the page boundary of the paged
memory; and
when in a second mode, only less than or equal to one
cache line width of the instruction data.
Example 9. A method comprising:
performing, by fetch circuitry of a processor, a single
fetch operation that fetches from a paged memory:
a multiple cache line width of instruction data, between
a minimum width that is greater than one cache line
and a maximum width that is a plurality of cache
lines, when the multiple cache line width of the
instruction data does not include a page boundary of
the paged memory, and
less than or equal to one cache line width of the
instruction data when the multiple cache line width
of the instruction data does include the page bound-
ary of the paged memory;
decoding, by decoder circuitry of the processor, a single
instruction, comprising an opcode, from the instruction
data into a decoded instruction; and
executing, by execution circuitry of the processor, the
decoded instruction according to the opcode.
Example 10. The method of example 9, wherein the fetch
circuitry performing the single fetch operation is in a single
cycle of the processor.
Example 11. The method of example 10, wherein the
fetch circuitry does not support multiple page lookups in a
single cycle of the processor.
Example 12. The method of example 9, wherein the fetch
circuitry does not support multiple page lookups in a single
cycle of the processor.
Example 13. The method of example 9, wherein the
maximum width is two cache lines.
Example 14. The method of example 13, wherein the two
cache lines are 128 Bytes wide.
Example 15. The method of example 14, wherein the
minimum width is 65 Bytes.
Example 16. The method of example 9, wherein the
performing the single fetch operation that fetches from the
paged memory:
when the fetch circuitry is in a first mode, the multiple
cache line width of the instruction data, between the mini-
mum width that is greater than one cache line and the
maximum width that is the plurality of cache lines, when the
multiple cache line width of the instruction data does not
include the page boundary of the paged memory, and less
than or equal to one cache line width of the instruction data
when the multiple cache line width of the instruction data
does include the page boundary of the paged memory; and
when the fetch circuitry is in a second mode, only less
than or equal to one cache line width of the instruction
data.
Example 17. A system comprising:
a paged memory;
fetch circuitry to perform a single fetch operation to fetch
from the paged memory:
a multiple cache line width of instruction data, between
a minimum width that is greater than one cache line
and a maximum width that is a plurality of cache lines, when the multiple cache line width of the
instruction data does not include a page boundary of
the paged memory, and less than or equal to one
cache line width of the instruction data when the
multiple cache line width of the instruction data does
include the page boundary of the paged memory;
decoder circuitry to decode a single instruction, compris-
ing an opcode, from the instruction data into a decoded
instruction; and
execution circuitry to execute the decoded instruction
according to the opcode.
Example 18. The system of example 17, wherein the fetch
circuitry is to perform the single fetch operation in a single
cycle of the system.
Example 19. The system of example 18, wherein the fetch
circuitry is to not support multiple page lookups in a single
cycle of the system.
Example 20. The system of example 17, wherein the fetch
circuitry is to not support multiple page lookups in a single
cycle of the system.
Example 21. The system of example 17, wherein the
maximum width is two cache lines.
Example 22. The system of example 21, wherein the two
cache lines are 128 Bytes wide.
Example 23. The system of example 22, wherein the
minimum width is 65 Bytes.
Example 24. The system of example 17, wherein the fetch
circuitry is to perform the single fetch operation to fetch
from the paged memory:
when in a first mode, the multiple cache line width of the
instruction data, between the minimum width that is
greater than one cache line and the maximum width
that is the plurality of cache lines, when the multiple
cache line width of the instruction data does not include
the page boundary of the paged memory, and less than
or equal to one cache line width of the instruction data
when the multiple cache line width of the instruction
data does include the page boundary of the paged
memory; and
when in a second mode, only less than or equal to one
cache line width of the instruction data.
Example Computer Architectures.
Detailed below are descriptions of example computer
architectures. Other system designs and configurations
known in the arts for laptop, desktop, and handheld personal
computers (PC)s, personal digital assistants, engineering
workstations, servers, disaggregated servers, network
devices, network hubs, switches, routers, embedded proces-
sors, digital signal processors (DSPs), graphics devices,
video game devices, set-top boxes, micro controllers, cell
phones, portable media players, hand-held devices, and
various other electronic devices, are also suitable. In general,
a variety of systems or electronic devices capable of incor-
porating a processor and/or other execution logic as dis-
closed herein are generally suitable.
FIG. 9 illustrates an example computing system. Multi-
processor system 900 is an interfaced system and includes a
plurality of processors or cores including a first processor
970 and a second processor 980 coupled via an interface 950
such as a point-to-point (P-P) interconnect, a fabric, and/or
bus. In some examples, the first processor 970 and the
second processor 980 are homogeneous. In some examples,
first processor 970 and the second processor 980 are het-
erogenous. Though the example system 900 is shown to
have two processors, the system may have three or more
processors, or may be a single processor system. In some
examples, the computing system is a system on a chip (SoC).

Processors 970 and 980 are shown including integrated memory controller (IMC) circuitry 972 and 982, respectively. Processor 970 also includes interface circuits 976 and 978; similarly, second processor 980 includes interface circuits 986 and 988. Processors 970, 980 may exchange information via the interface 950 using interface circuits 978, 988. IMCs 972 and 982 couple the processors 970, 980 to respective memories, namely a memory 932 and a memory 934, which may be portions of main memory locally attached to the respective processors.

Processors 970, 980 may each exchange information with a network interface (NW I/F) 990 via individual interfaces 952, 954 using interface circuits 976, 994, 986, 998. The network interface 990 (e.g., one or more of an interconnect, bus, and/or fabric, and in some examples is a chipset) may optionally exchange information with a coprocessor 938 via an interface circuit 992. In some examples, the coprocessor 938 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 970, 980 or outside of both processors, yet connected with the processors via an interface such as P-P interconnect, such that either or both processors' local cache information may be stored in the shared cache if a processor is placed into a low power mode.

Network interface 990 may be coupled to a first interface 916 via interface circuit 996. In some examples, first interface 916 may be an interface such as a Peripheral Component Interconnect (PCI) interconnect, a PCI Express interconnect or another I/O interconnect. In some examples, first interface 916 is coupled to a power control unit (PCU) 917, which may include circuitry, software, and/or firmware to perform power management operations with regard to the processors 970, 980 and/or co-processor 938. PCU 917 provides control information to a voltage regulator (not shown) to cause the voltage regulator to generate the appropriate regulated voltage. PCU 917 also provides control information to control the operating voltage generated. In various examples, PCU 917 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 917 is illustrated as being present as logic separate from the processor 970 and/or processor 980. In other cases, PCU 917 may execute on a given one or more of cores (not shown) of processor 970 or 980. In some cases, PCU 917 may be implemented as a microcontroller (dedicated or general-purpose) or other control logic configured to execute its own dedicated power management code, sometimes referred to as P-code. In yet other examples, power management operations to be performed by PCU 917 may be implemented externally to a processor, such as by way of a separate power management integrated circuit (PMIC) or another component external to the processor. In yet other examples, power management operations to be performed by PCU 917 may be implemented within BIOS or other system software.

Various I/O devices 914 may be coupled to first interface 916, along with a bus bridge 918 which couples first interface 916 to a second interface 920. In some examples, one or more additional processor(s) 915, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 916. In some examples, second interface 920 may be a low pin count (LPC) interface. Various devices may be coupled to second interface 920 including, for example, a keyboard and/or mouse 922, communication devices 927 and storage circuitry 928. Storage circuitry 928 may be one or more non-transitory machine-readable storage media as described below, such as a disk drive or other mass storage device which may include instructions/code and data 930 and may implement the storage 603 in some examples. Further, an audio I/O 924 may be coupled to second interface 920. Note that other architectures than the point-to-point architecture described above are possible. For example, instead of the point-to-point architecture, a system such as multiprocessor system 900 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 10:
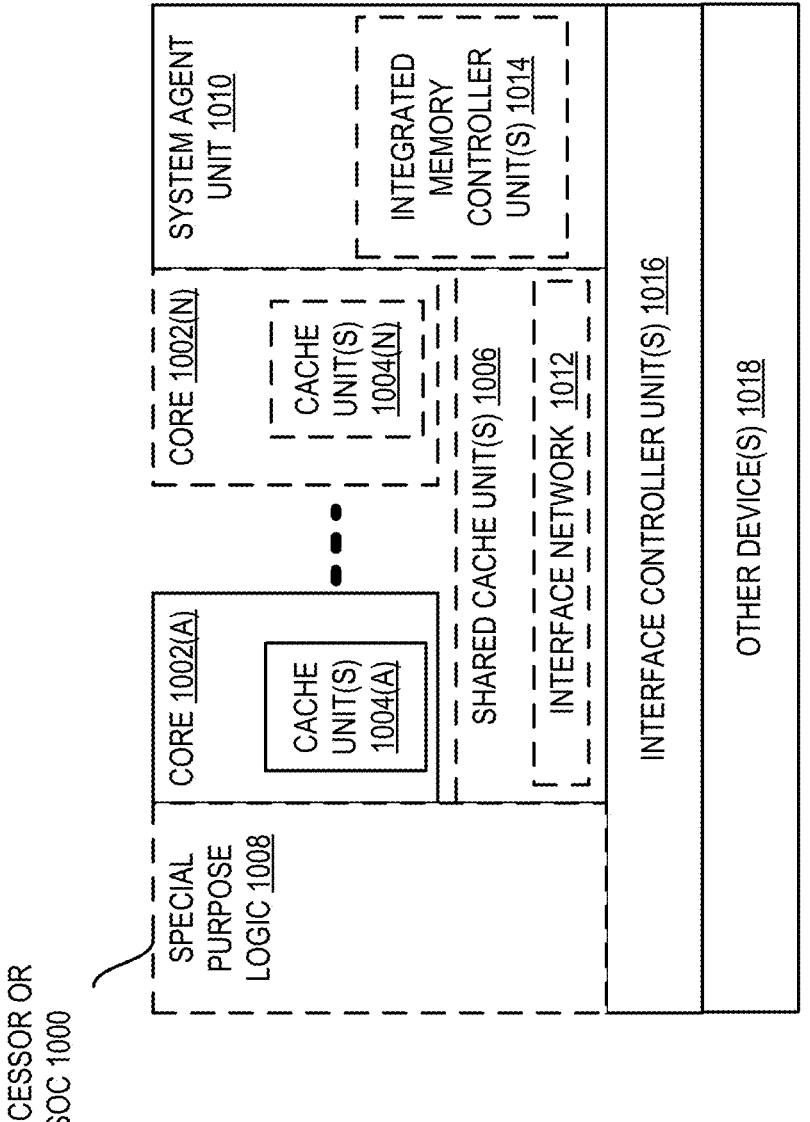
FIG. 10 illustrates a block diagram of an example processor and/or System on a Chip (SoC) that may have one or more cores and an integrated memory controller.

FIG. 10 illustrates a block diagram of an example processor and/or SoC 1000 that may have one or more cores and an integrated memory controller. The solid lined boxes illustrate a processor 1000 with a single core 1002(A), system agent unit circuitry 1010, and a set of one or more interface controller unit(s) circuitry 1016, while the optional addition of the dashed lined boxes illustrates an alternative processor 1000 with multiple cores 1002(A)-(N), a set of one or more integrated memory controller unit(s) circuitry 1014 in the system agent unit circuitry 1010, and special purpose logic 1008, as well as a set of one or more interface controller units circuitry 1016. Note that the processor 1000 may be one of the processors 970 or 980, or co-processor 938 or 915 of FIG. 9.

Thus, different implementations of the processor 1000 may include: 1) a CPU with the special purpose logic 1008 being integrated graphics and/or scientific (throughput) logic (which may include one or more cores, not shown), and the cores 1002(A)-(N) being one or more general purpose cores (e.g., general purpose in-order cores, general purpose out-of-order cores, or a combination of the two); 2) a coprocessor with the cores 1002(A)-(N) being a large number of special purpose cores intended primarily for graphics and/or scientific (throughput); and 3) a coprocessor with the cores 1002(A)-(N) being a large number of general purpose in-order cores. Thus, the processor 1000 may be a general-purpose processor, coprocessor, or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1004(A)-(N) within the cores 1002(A)-(N), a set of one or more shared cache unit(s) circuitry 1006, and external memory (not shown) coupled to the set of integrated memory controller unit(s) circuitry 1014. The set of one or more shared cache unit(s) circuitry 1006 may include one or more mid-level caches, such as level 2 (L2), level 3 (L3), level 4 (L4), or other levels of cache, such as a last level cache (LLC), and/or combinations thereof. While in some examples interface network circuitry 1012 (e.g., a ring interconnect) interfaces the special purpose logic 1008 (e.g., integrated graphics logic), the set of shared cache unit(s) circuitry 1006, and the system agent unit circuitry 1010, alternative examples use any number of well-known techniques for interfacing such units. In some examples, coherency is maintained between one or more of the shared cache unit(s) circuitry 1006 and cores 1002(A)-(N). In some examples, interface controller units circuitry 1016 couple the cores 1002 to one or more other devices 1018 such as one or more I/O devices, storage, one or more communication devices (e.g., wireless networking, wired networking, etc.), etc.

In some examples, one or more of the cores 1002(A)-(N) are capable of multi-threading. The system agent unit circuitry 1010 includes those components coordinating and operating cores 1002(A)-(N). The system agent unit circuitry 1010 may include, for example, power control unit (PCU) circuitry and/or display unit circuitry (not shown). The PCU may be or may include logic and components needed for regulating the power state of the cores 1002(A)-(N) and/or the special purpose logic 1008 (e.g., integrated graphics logic). The display unit circuitry is for driving one or more externally connected displays.

The cores 1002(A)-(N) may be homogenous in terms of instruction set architecture (ISA). Alternatively, the cores 1002(A)-(N) may be heterogeneous in terms of ISA; that is, a subset of the cores 1002(A)-(N) may be capable of executing an ISA, while other cores may be capable of executing only a subset of that ISA or another ISA.

Example Core Architectures—In-Order and Out-of-Order Core Block Diagram.

Figure 11A:
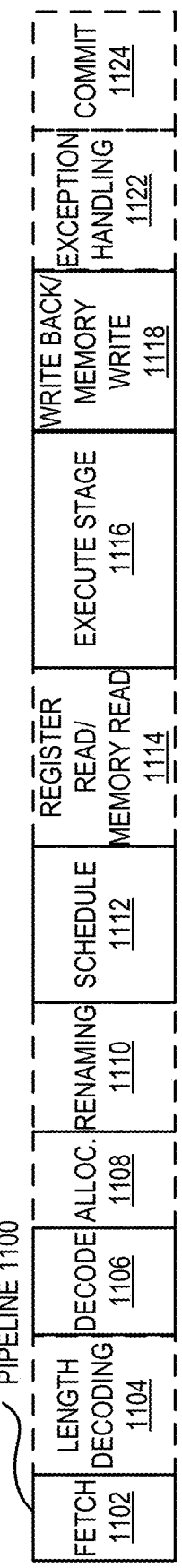
FIG. 11A is a block diagram illustrating both an example in-order pipeline and an example register renaming, out-of-order issue/execution pipeline according to examples.
Figure 11B:
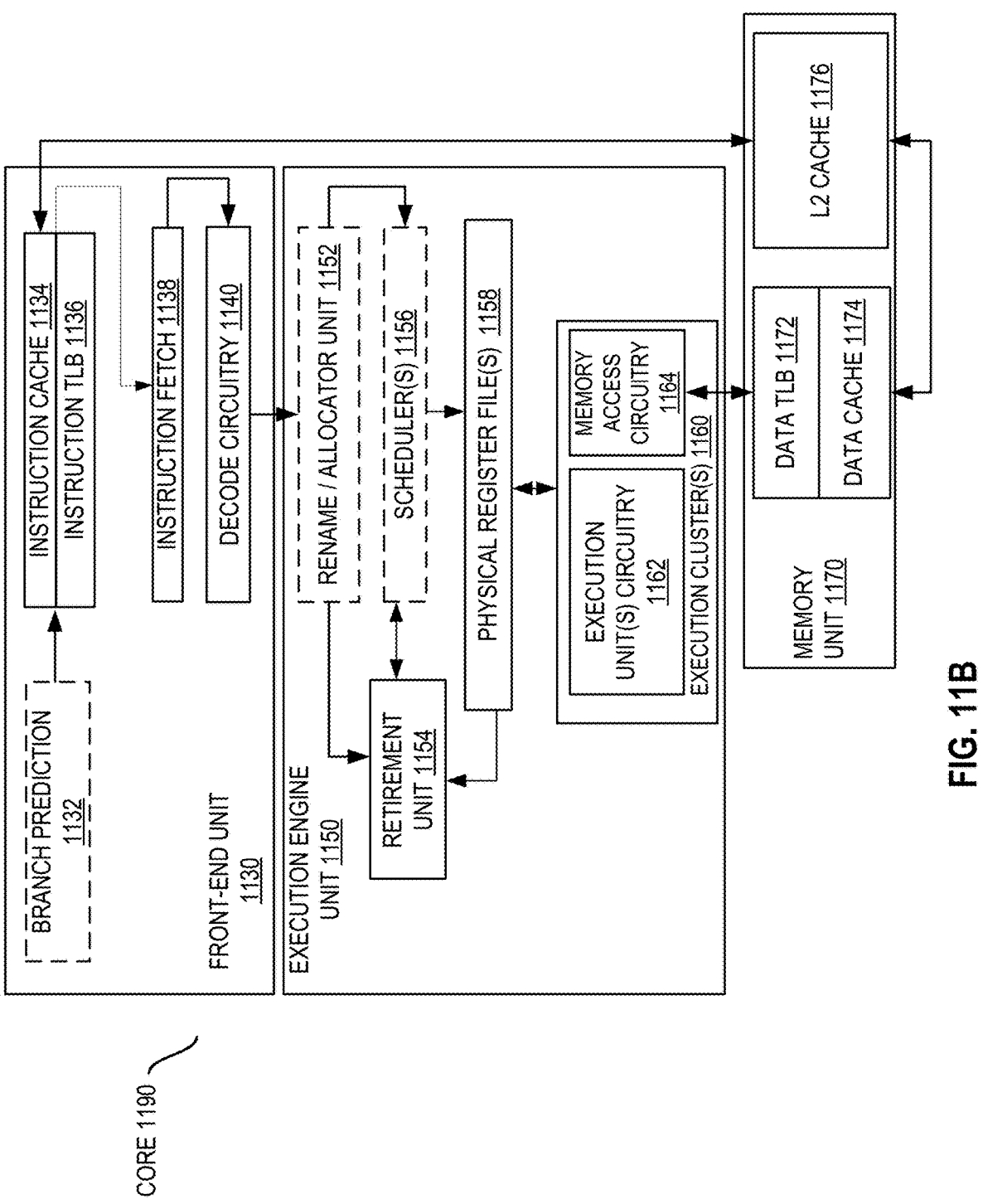
FIG. 11B is a block diagram illustrating both an example in-order architecture core and an example register renaming, out-of-order issue/execution architecture core to be included in a processor according to examples.

FIG. 11A is a block diagram illustrating both an example in-order pipeline and an example register renaming, out-of-order issue/execution pipeline according to examples. FIG. 11B is a block diagram illustrating both an example in-order architecture core and an example register renaming, out-of-order issue/execution architecture core to be included in a processor according to examples. The solid lined boxes in FIGS. 11A-11B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, an optional length decoding stage 1104, a decode stage 1106, an optional allocation (Alloc) stage 1108, an optional renaming stage 1110, a schedule (also known as a dispatch or issue) stage 1112, an optional register read/ memory read stage 1114, an execute stage 1116, a write back/memory write stage 1118, an optional exception handling stage 1122, and an optional commit stage 1124. One or more operations can be performed in each of these processor pipeline stages. For example, during the fetch stage 1102, one or more instructions are fetched from instruction memory, and during the decode stage 1106, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1106 and the register read/ memory read stage 1114 may be combined into one pipeline stage. In one example, during the execute stage 1116, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 11B may implement the pipeline 1100 as follows: 1) the instruction fetch circuitry 1138 performs the fetch and length decoding stages 1102 and 1104; 2) the decode circuitry 1140 performs the decode stage 1106; 3) the rename/allocator unit circuitry 1152 performs the allocation stage 1108 and renaming stage 1110; 4) the scheduler(s) circuitry 1156 performs the schedule stage 1112; 5) the physical register file(s) circuitry 1158 and the memory unit circuitry 1170 perform the register read/memory read stage 1114; the execution cluster(s) 1160 perform the execute stage 1116; 6) the memory unit circuitry 1170 and the physical register file(s) circuitry 1158 perform the write back/memory write stage 1118; 7) various circuitry may be involved in the exception handling stage 1122; and 8) the retirement unit circuitry 1154 and the physical register file(s) circuitry 1158 perform the commit stage 1124.

FIG. 11B shows a processor core 1190 including front-end unit circuitry 1130 coupled to execution engine unit circuitry 1150, and both are coupled to memory unit circuitry 1170. The core 1190 may be a reduced instruction set architecture computing (RISC) core, a complex instruction set architecture computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front-end unit circuitry 1130 may include branch prediction circuitry 1132 coupled to instruction cache circuitry 1134, which is coupled to an instruction translation lookaside buffer (TLB) 1136, which is coupled to instruction fetch circuitry 1138, which is coupled to decode circuitry 1140. In one example, the instruction cache circuitry 1134 is included in the memory unit circuitry 1170 rather than the front-end circuitry 1130. The decode circuitry 1140 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1140 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1140 may be implemented using various different mechanisms. Examples of suitable mechanisms include, but are not limited to, look-up tables, hardware implementations, programmable logic arrays (PLAs), microcode read only memories (ROMs), etc. In one example, the core 1190 includes a microcode ROM (not shown) or other medium that stores microcode for certain macroinstructions (e.g., in decode circuitry 1140 or otherwise within the front-end circuitry 1130). In one example, the decode circuitry 1140 includes a micro-operation (micro-op) or operation cache (not shown) to hold/cache decoded operations, micro-tags, or micro-operations generated during the decode or other stages of the processor pipeline 1100. The decode circuitry 1140 may be coupled to rename/allocator unit circuitry 1152 in the execution engine circuitry 1150.

The execution engine circuitry 1150 includes the rename/allocator unit circuitry 1152 coupled to retirement unit circuitry 1154 and a set of one or more scheduler(s) circuitry 1156. The scheduler(s) circuitry 1156 represents any number of different schedulers, including reservations stations, central instruction window, etc. In some examples, the scheduler(s) circuitry 1156 can include arithmetic logic unit (ALU) scheduler/scheduling circuitry, ALU queues, address generation unit (AGU) scheduler/scheduling circuitry, AGU queues, etc. The scheduler(s) circuitry 1156 is coupled to the physical register file(s) circuitry 1158. Each of the physical register file(s) circuitry 1158 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1158 includes vector registers unit circuitry, writemask registers unit circuitry, and scalar register unit circuitry. These register units may provide architectural vector registers, vector mask registers, general-purpose registers, etc. The physical register file(s) circuitry 1158 is coupled to the retirement unit circuitry 1154 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1154 and the physical register file(s) circuitry 1158 are coupled to the execution cluster(s) 1160. The execution cluster(s) 1160 includes a set of one or more execution unit(s) circuitry 1162 and a set of one or more memory access circuitry 1164. The execution unit(s) circuitry 1162 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1156, physical register file(s) circuitry 1158, and execution cluster(s) 1160 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1164). It should also be understood that where separate pipelines are used, one or more of these pipelines may be out-of-order issue/execution and the rest in-order.

In some examples, the execution engine unit circuitry 1150 may perform load store unit (LSU) address/data pipelining to an Advanced Microcontroller Bus (AMB) interface (not shown), and address phase and writeback, data phase load, store, and branches.

The set of memory access circuitry 1164 is coupled to the memory unit circuitry 1170, which includes data TLB circuitry 1172 coupled to data cache circuitry 1174 coupled to level 2 (L2) cache circuitry 1176. In one example, the memory access circuitry 1164 may include load unit circuitry, store address unit circuitry, and store data unit circuitry, each of which is coupled to the data TLB circuitry 1172 in the memory unit circuitry 1170. The instruction cache circuitry 1134 is further coupled to the level 2 (L2) cache circuitry 1176 in the memory unit circuitry 1170. In one example, the instruction cache 1134 and the data cache 1174 are combined into a single instruction and data cache (not shown) in L2 cache circuitry 1176, level 3 (L3) cache circuitry (not shown), and/or main memory. The L2 cache circuitry 1176 is coupled to one or more other levels of cache and eventually to a main memory.

The core 1190 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1190 includes logic to support a packed data instruction set architecture extension (e.g., AVX1, AVX2), thereby allowing the operations used by many multimedia applications to be performed using packed data.

Example Execution Unit(s) Circuitry.

Figure 12:
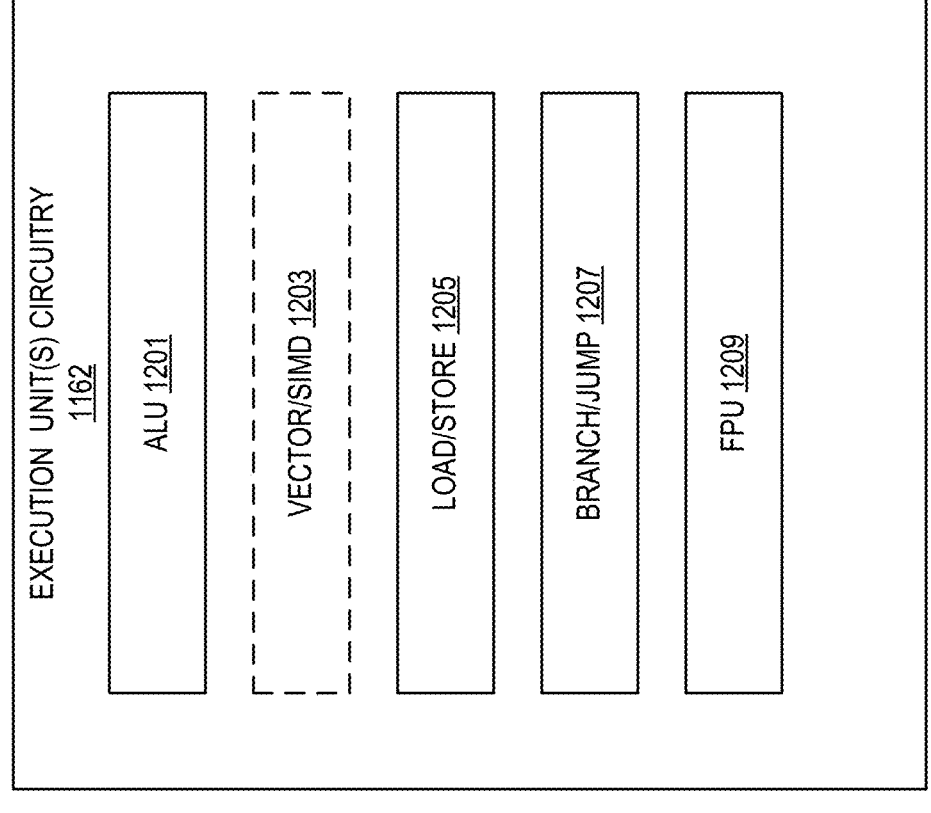
FIG. 12 illustrates examples of execution unit(s) circuitry.

FIG. 12 illustrates examples of execution unit(s) circuitry, such as execution unit(s) circuitry 1162 of FIG. 11B. As illustrated, execution unit(s) circuitry 1162 may include one or more ALU circuits 1201, optional vector/single instruction multiple data (SIMD) circuits 1203, load/store circuits 1205, branch/jump circuits 1207, and/or Floating-point unit (FPU) circuits 1209. ALU circuits 1201 perform integer arithmetic and/or Boolean operations. Vector/SIMD circuits 1203 perform vector/SIMD operations on packed data (such as SIMD/vector registers). Load/store circuits 1205 execute load and store instructions to load data from memory into registers or store from registers to memory. Load/store circuits 1205 may also generate addresses. Branch/jump circuits 1207 cause a branch or jump to a memory address depending on the instruction. FPU circuits 1209 perform floating-point arithmetic. The width of the execution unit(s) circuitry 1162 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

FIG. 13 is a block diagram of a register architecture 1300 according to some examples. As illustrated, the register architecture 1300 includes vector/SIMD registers 1310 that vary from 128-bit to 1,024 bits width. In some examples, the vector/SIMD registers 1310 are physically 512-bits and, depending upon the mapping, only some of the lower bits are used. For example, in some examples, the vector/SIMD registers 1310 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1300 includes writemask/predicate registers 1315. For example, in some examples, there are 8 writemask/predicate registers (sometimes called k0 through k7) that are each 16-bit, 32-bit, 64-bit, or 128-bit in size. Writemask/predicate registers 1315 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1315 corresponds to a data element position of the destination. In other examples, the writemask/predicate registers 1315 are scalable and consists of a set number of enable bits for a given vector element (e.g., 8 enable bits per 64-bit vector element).

The register architecture 1300 includes a plurality of general-purpose registers 1325. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1300 includes scalar floating-point (FP) register file 1345 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1340 (e.g., EFLAGS, RFLAGS, etc.) store status and control information for arithmetic, compare, and system operations. For example, the one or more flag registers 1340 may store condition code information such as carry, parity, auxiliary carry, zero, sign, and overflow. In some examples, the one or more flag registers 1340 are called program status and control registers.

Segment registers 1320 contain segment points for use in accessing memory. In some examples, these registers are referenced by the names CS, DS, SS, ES, FS, and GS.

Machine specific registers (MSRs) 1335 control and report on processor performance. Most MSRs 1335 handle system-related functions and are not accessible to an application program. Machine check registers 1360 consist of control, status, and error reporting MSRs that are used to detect and report on hardware errors.

One or more instruction pointer register(s) 1330 store an instruction pointer value. Control register(s) 1355 (e.g., CR0-CR4) determine the operating mode of a processor (e.g., processor 970, 980, 938, 915, and/or 1000) and the characteristics of a currently executing task. Debug registers 1350 control and allow for the monitoring of a processor or core's debugging operations.

Memory (mem) management registers 1365 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 1300 may, for example, be used in register file/memory 608, or physical register file(s) circuitry 1158.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats.

Examples of the instruction(s) described herein may be embodied in different formats. Additionally, example systems, architectures, and pipelines are detailed below.

Examples of the instruction(s) may be executed on such systems, architectures, and pipelines, but are not limited to those detailed.

Figure 14:
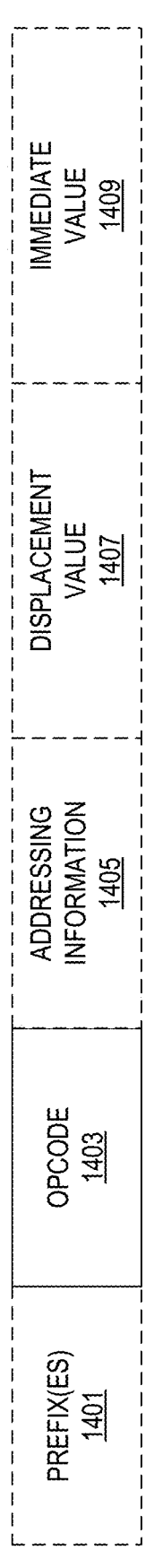
FIG. 14 illustrates examples of an instruction format.

FIG. 14 illustrates examples of an instruction format. As illustrated, an instruction may include multiple components including, but not limited to, one or more fields for: one or more prefixes 1401, an opcode 1403, addressing information 1405 (e.g., register identifiers, memory addressing information, etc.), a displacement value 1407, and/or an immediate value 1409. Note that some instructions utilize some or all the fields of the format whereas others may only use the field for the opcode 1403. In some examples, the order illustrated is the order in which these fields are to be encoded, however, it should be appreciated that in other examples these fields may be encoded in a different order, combined, etc.

The prefix(es) field(s) 1401, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1403 is used to at least partially define the operation to be performed upon a decoding of the instruction. In some examples, a primary opcode encoded in the opcode field 1403 is one, two, or three bytes in length. In other examples, a primary opcode can be a different length. An additional 3-bit opcode field is sometimes encoded in another field.

Figure 15:
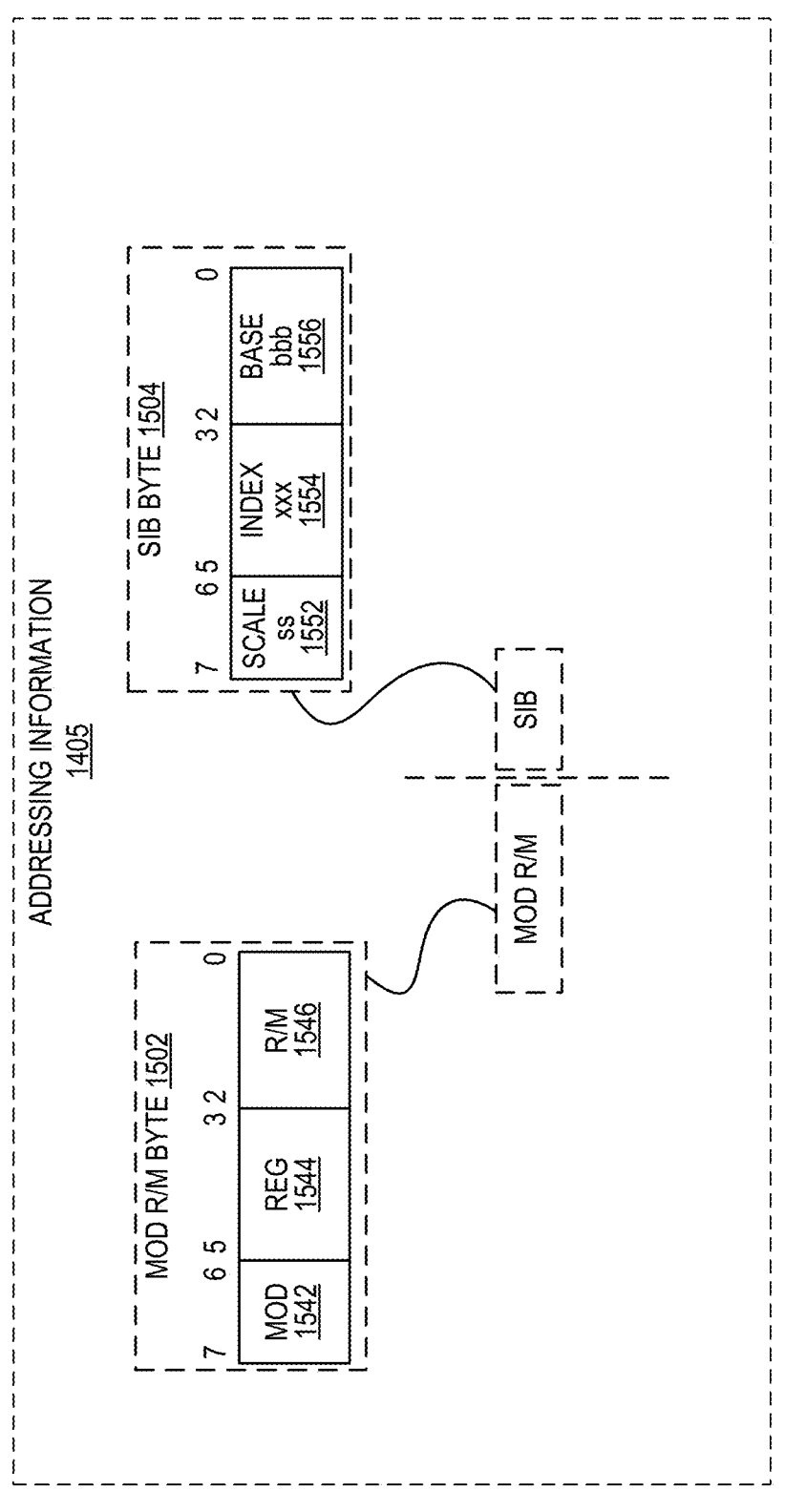
FIG. 15 illustrates examples of an addressing information field.

The addressing information field 1405 is used to address one or more operands of the instruction, such as a location in memory or one or more registers. FIG. 15 illustrates examples of the addressing information field 1405. In this illustration, an optional MOD R/M byte 1502 and an optional Scale, Index, Base (SIB) byte 1504 are shown. The MOD R/M byte 1502 and the SIB byte 1504 are used to encode up to two operands of an instruction, each of which is a direct register or effective memory address. Note that both of these fields are optional in that not all instructions include one or more of these fields. The MOD R/M byte 1502 includes a MOD field 1542, a register (reg) field 1544, and R/M field 1546.

The content of the MOD field 1542 distinguishes between memory access and non-memory access modes. In some examples, when the MOD field 1542 has a binary value of 11 (11b), a register-direct addressing mode is utilized, and otherwise a register-indirect addressing mode is used.

The register field 1544 may encode either the destination register operand or a source register operand or may encode an opcode extension and not be used to encode any instruction operand. The content of register field 1544, directly or through address generation, specifies the locations of a source or destination operand (either in a register or in memory). In some examples, the register field 1544 is supplemented with an additional bit from a prefix (e.g., prefix 1401) to allow for greater addressing.

The R/M field 1546 may be used to encode an instruction operand that references a memory address or may be used to encode either the destination register operand or a source register operand. Note the R/M field 1546 may be combined with the MOD field 1542 to dictate an addressing mode in some examples.

The SIB byte 1504 includes a scale field 1552, an index field 1554, and a base field 1556 to be used in the generation of an address. The scale field 1552 indicates a scaling factor. The index field 1554 specifies an index register to use. In some examples, the index field 1554 is supplemented with an additional bit from a prefix (e.g., prefix 1401) to allow for greater addressing. The base field 1556 specifies a base register to use. In some examples, the base field 1556 is supplemented with an additional bit from a prefix (e.g., prefix 1401) to allow for greater addressing. In practice, the content of the scale field 1552 allows for the scaling of the content of the index field 1554 for memory address generation (e.g., for address generation that uses $2^{scale}*index+base$).

Some addressing forms utilize a displacement value to generate a memory address. For example, a memory address may be generated according to $2^{scale}*index+base+displacement$, index*scale+displacement, r/m+displacement, instruction pointer (RIP/EIP)+displacement, register+displacement, etc. The displacement may be a 1-byte, 2-byte, 4-byte, etc. value. In some examples, the displacement field 1407 provides this value. Additionally, in some examples, a displacement factor usage is encoded in the MOD field of the addressing information field 1405 that indicates a compressed displacement scheme for which a displacement value is calculated and stored in the displacement field 1407.

In some examples, the immediate value field 1409 specifies an immediate value for the instruction. An immediate value may be encoded as a 1-byte value, a 2-byte value, a 4-byte value, etc.

FIG. 16 illustrates examples of a first prefix 1401(A). In some examples, the first prefix 1401(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1401(A) may specify up to three registers using 3-bit fields depending on the format: 1) using the reg field 1544 and the R/M field 1546 of the MOD R/M byte 1502; 2) using the MOD R/M byte 1502 with the SIB byte 1504 including using the reg field 1544 and the base field 1556 and index field 1554; or 3) using the register field of an opcode.

In the first prefix 1401(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1544 and MOD R/M R/M field 1546 alone can each only address 8 registers.

In the first prefix 1401(A), bit position 2 (R) may be an extension of the MOD R/M reg field 1544 and may be used to modify the MOD R/M reg field 1544 when that field encodes a general-purpose register, a 64-bit packed data register (e.g., an SSE register), or a control or debug register. R is ignored when MOD R/M byte 1502 specifies other registers or defines an extended opcode.

Bit position 1 (X) may modify the SIB byte index field 1554.

Bit position 0 (B) may modify the base in the MOD R/M R/M field 1546 or the SIB byte base field 1556; or it may modify the opcode register field used for accessing general purpose registers (e.g., general purpose registers 1325).

FIGS. 17A-17D illustrate examples of how the R, X, and B fields of the first prefix 1401(A) are used. FIG. 17A illustrates R and B from the first prefix 1401(A) being used to extend the reg field 1544 and R/M field 1546 of the MOD R/M byte 1502 when the SIB byte 1504 is not used for memory addressing. FIG. 17B illustrates R and B from the first prefix 1401(A) being used to extend the reg field 1544 and R/M field 1546 of the MOD R/M byte 1502 when the SIB byte 1504 is not used (register-register addressing). FIG. 17C illustrates R, X, and B from the first prefix 1401(A) being used to extend the reg field 1544 of the MOD R/M byte 1502 and the index field 1554 and base field 1556 when the SIB byte 1504 being used for memory addressing. FIG. 17D illustrates B from the first prefix 1401(A) being used to extend the reg field 1544 of the MOD R/M byte 1502 when a register is encoded in the opcode 1403.

Figures 18A, 18B:
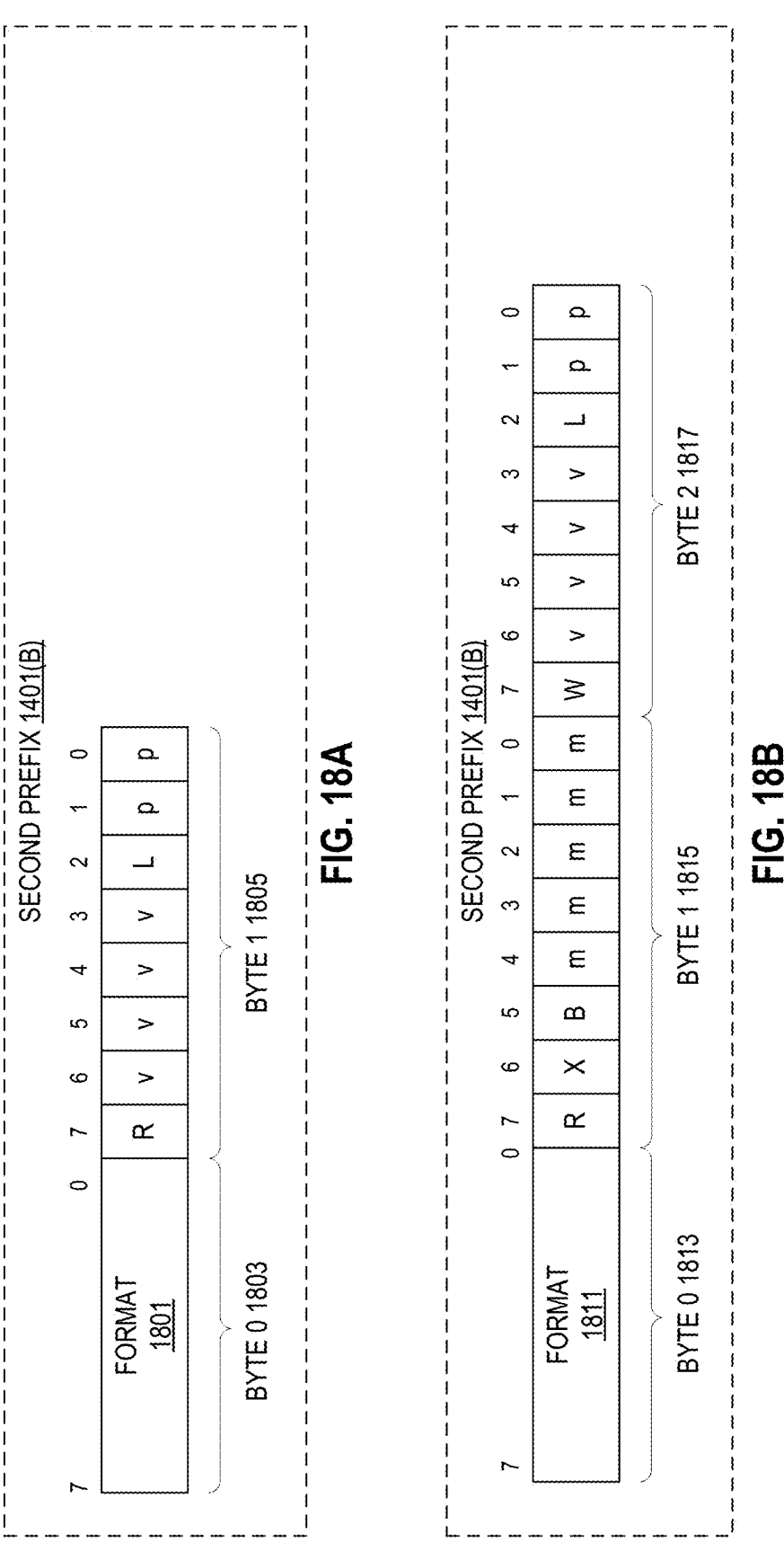
FIGS. 18A-18B illustrate examples of a second prefix.

FIGS. 18A-18B illustrate examples of a second prefix 1401(B). In some examples, the second prefix 1401(B) is an example of a VEX prefix. The second prefix 1401(B) encoding allows instructions to have more than two operands, and allows SIMD vector registers (e.g., vector/SIMD registers 1310) to be longer than 64-bits (e.g., 128-bit and 256-bit). The use of the second prefix 1401(B) provides for three-operand (or more) syntax. For example, previous two-operand instructions performed operations such as A=A+B, which overwrites a source operand. The use of the second prefix 1401(B) enables operands to perform nondestructive operations such as A=B+C.

In some examples, the second prefix 1401(B) comes in two forms—a two-byte form and a three-byte form. The two-byte second prefix 1401(B) is used mainly for 128-bit, scalar, and some 256-bit instructions; while the three-byte second prefix 1401(B) provides a compact replacement of the first prefix 1401(A) and 3-byte opcode instructions.

FIG. 18A illustrates examples of a two-byte form of the second prefix 1401(B). In one example, a format field 1801 (byte 0 1803) contains the value C5H. In one example, byte 1 1805 includes an "R" value in bit[7]. This value is the complement of the "R" value of the first prefix 1401(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1546 to encode the instruction operand that references a memory address or encode either the destination register operand or a source register operand.

Instructions that use this prefix may use the MOD R/M reg field 1544 to encode either the destination register operand or a source register operand, or to be treated as an opcode extension and not used to encode any instruction operand.

For instruction syntax that support four operands, vvvv, the MOD R/M R/M field 1546 and the MOD R/M reg field

1544 encode three of the four operands. Bits[7:4] of the immediate value field 1409 are then used to encode the third source register operand.

FIG. 18B illustrates examples of a three-byte form of the second prefix 1401(B). In one example, a format field 1811 (byte 0 1813) contains the value C4H. Byte 1 1815 includes in bits[7:5] "R," "X," and "B" which are the complements of the same values of the first prefix 1401(A). Bits[4:0] of byte 1 1815 (shown as mmmmm) include content to encode, as need, one or more implied leading opcode bytes. For example, 00001 implies a 0FH leading opcode, 00010 implies a 0F38H leading opcode, 00011 implies a 0F3AH leading opcode, etc.

Bit[7] of byte 2 1817 is used similar to W of the first prefix 1401(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1546 to encode the instruction operand that references a memory address or encode either the destination register operand or a source register operand.

Instructions that use this prefix may use the MOD R/M reg field 1544 to encode either the destination register operand or a source register operand, or to be treated as an opcode extension and not used to encode any instruction operand.

For instruction syntax that support four operands, vvvv, the MOD R/M R/M field 1546, and the MOD R/M reg field 1544 encode three of the four operands. Bits[7:4] of the immediate value field 1409 are then used to encode the third source register operand.

Figure 19:
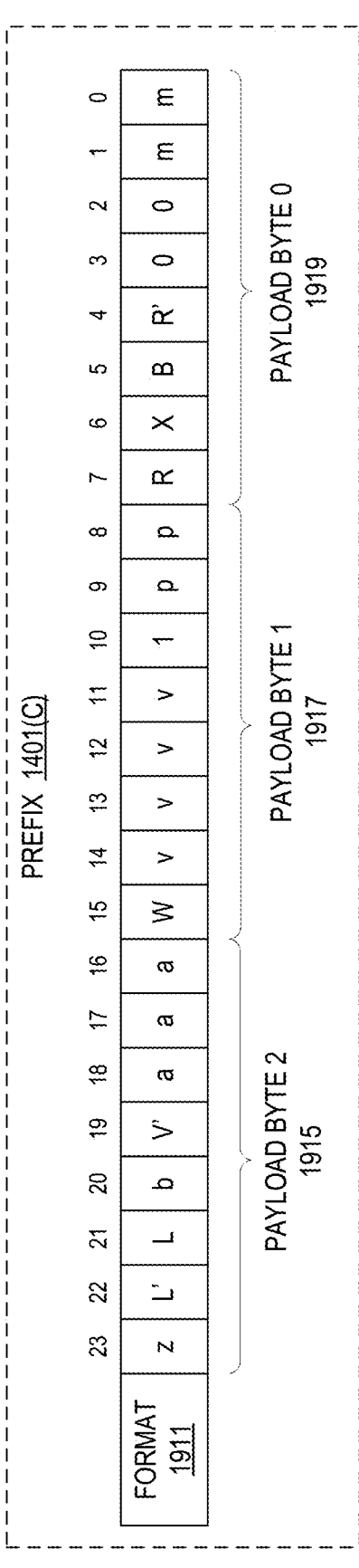
FIG. 19 illustrates examples of a third prefix.

FIG. 19 illustrates examples of a third prefix 1401(C). In some examples, the third prefix 1401(C) is an example of an EVEX prefix. The third prefix 1401(C) is a four-byte prefix.

The third prefix 1401(C) can encode 32 vector registers (e.g., 128-bit, 256-bit, and 512-bit registers) in 64-bit mode. In some examples, instructions that utilize a writemask/opmask (see discussion of registers in a previous FIG, such as FIG. 13) or predication utilize this prefix. Opmask register allow for conditional processing or selection control. Opmask instructions, whose source/destination operands are opmask registers and treat the content of an opmask register as a single value, are encoded using the second prefix 1401(B).

The third prefix 1401(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1401(C) is a format field 1911 that has a value, in one example, of 62H. Subsequent bytes are referred to as payload bytes 1915-1919 and collectively form a 24-bit value of P[23:0] providing specific capability in the form of one or more fields (detailed herein).

In some examples, P[1:0] of payload byte 1919 are identical to the low two mm bits. P[3:2] are reserved in some examples. Bit P[4] (R') allows access to the high 16 vector register set when combined with P[7] and the MOD R/M reg field 1544. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 1544 and MOD R/M R/M field 1546. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1401(A) and second prefix 1411B and may serve as an opcode extension bit or operand size promotion.

P[18:16] specify the index of a register in the opmask (writemask) registers (e.g., writemask/predicate registers 1315). In one example, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22: 21]). P[23] indicates support for merging-writemasking (e.g., when set to 0) or support for zeroing and merging-writemasking (e.g., when set to 1).

Example examples of encoding of registers in instructions using the third prefix 1401(C) are detailed in the following tables.

TABLE 1

| 32-Register Support in 64-bit Mode | | | | | |
|---|---|---|---|---|---|
| | 4 | 3 | [2:0] | REG. TYPE | COMMON USAGES |
| REG | R' | R | MOD R/M reg | GPR, Vector | Destination or Source |
| VVVV | V' | | vvvv | GPR, Vector | 2nd Source or Destination |
| RM | X | B | MOD R/M R/M | GPR, Vector | 1st Source or Destination |
| BASE | 0 | B | MOD R/M R/M | GPR | Memory addressing |
| INDEX | 0 | X | SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
| | [2:0] | REG. TYPE | COMMON USAGES |
| REG | MOD R/M reg | GPR, Vector | Destination or Source |
| VVVV | vvvv | GPR, Vector | $2^{nd}$ Source or Destination |
| RM | MOD R/M R/M | GPR, Vector | $1^{st}$ Source or Destination |
| BASE | MOD R/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
| | [2:0] | REG. TYPE | COMMON USAGES |
| REG | MOD R/M Reg | k0-k7 | Source |
| VVVV | vvvv | k0-k7 | $2^{nd}$ Source |
| RM | MOD R/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products. Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 20 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 20 shows a program in a high-level language 2002 may be compiled using a first ISA compiler 2004 to generate first ISA binary code 2006 that may be natively executed by a processor with at least one first ISA core 2016. The processor with at least one first ISA core 2016 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 2004 represents a compiler that is operable to generate first ISA binary code 2006 (e.g., object code) that can, with or without additional linkage processing, be executed on the processor with at least one first ISA core 2016. Similarly, FIG. 20 shows the program in the high-level language 2002 may be compiled using an alternative ISA compiler 2008 to generate alternative ISA binary code 2010 that may be natively executed by a processor without a first ISA core 2014. The instruction converter 2012 is used to convert the first ISA binary code 2006 into code that may be natively executed by the processor without a first ISA core 2014. This converted code is not necessarily to be the same as the alternative ISA binary code 2010; however, the converted code will accomplish the general operation and be made up of instructions from the alternative ISA. Thus, the instruction converter 2012 represents software, firmware, hardware, or a combination thereof that, through emulation, simulation, or any other process, allows a processor or other electronic device that does not have a first ISA processor or core to execute the first ISA binary code 2006.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (e.g., A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
   fetch circuitry to perform a single fetch operation to fetch from a paged memory:
   a multiple cache line width of instruction data, between a minimum width that is greater than one cache line and a maximum width that is a plurality of cache lines, when the multiple cache line width of the instruction data does not include a page boundary of the paged memory, and
   less than or equal to one cache line width of the instruction data when the multiple cache line width of the instruction data does include the page boundary of the paged memory;
   decoder circuitry to decode a single instruction, comprising an opcode, from the instruction data into a decoded instruction; and
   execution circuitry to execute the decoded instruction according to the opcode.

2. The apparatus of claim 1, wherein the fetch circuitry is to perform the single fetch operation in a single cycle of the apparatus.

3. The apparatus of claim 2, wherein the fetch circuitry is to not support multiple page lookups in a single cycle of the apparatus.

4. The apparatus of claim 1, wherein the fetch circuitry is to not support multiple page lookups in a single cycle of the apparatus.

5. The apparatus of claim 1, wherein the maximum width is two cache lines.

6. The apparatus of claim 5, wherein the two cache lines are 128 Bytes wide.

7. The apparatus of claim 6, wherein the minimum width is 65 Bytes.

8. The apparatus of claim 1, wherein the fetch circuitry is to perform the single fetch operation to fetch from the paged memory:

when in a first mode, the multiple cache line width of the instruction data, between the minimum width that is greater than one cache line and the maximum width that is the plurality of cache lines, when the multiple cache line width of the instruction data does not include the page boundary of the paged memory, and less than or equal to one cache line width of the instruction data when the multiple cache line width of the instruction data does include the page boundary of the paged memory; and when in a second mode, only less than or equal to one cache line width of the instruction data.

9. A method comprising:

performing, by fetch circuitry of a processor, a single fetch operation that fetches from a paged memory:

a multiple cache line width of instruction data, between a minimum width that is greater than one cache line and a maximum width that is a plurality of cache lines, when the multiple cache line width of the instruction data does not include a page boundary of the paged memory, and less than or equal to one cache line width of the instruction data when the multiple cache line width of the instruction data does include the page boundary of the paged memory;

decoding, by decoder circuitry of the processor, a single instruction, comprising an opcode, from the instruction data into a decoded instruction; and executing, by execution circuitry of the processor, the decoded instruction according to the opcode.

10. The method of claim 9, wherein the fetch circuitry performing the single fetch operation is in a single cycle of the processor.

11. The method of claim 10, wherein the fetch circuitry does not support multiple page lookups in a single cycle of the processor.

12. The method of claim 9, wherein the fetch circuitry does not support multiple page lookups in a single cycle of the processor.

13. The method of claim 9, wherein the maximum width is two cache lines.

14. The method of claim 13, wherein the two cache lines are 128 Bytes wide.

15. The method of claim 14, wherein the minimum width is 65 Bytes.

16. The method of claim 9, wherein the performing the single fetch operation that fetches from the paged memory:

when the fetch circuitry is in a first mode, the multiple cache line width of the instruction data, between the minimum width that is greater than one cache line and the maximum width that is the plurality of cache lines, when the multiple cache line width of the instruction data does not include the page boundary of the paged memory, and less than or equal to one cache line width of the instruction data when the multiple cache line width of the instruction data does include the page boundary of the paged memory; and when the fetch circuitry is in a second mode, only less than or equal to one cache line width of the instruction data.

17. A system comprising:

a paged memory;

fetch circuitry to perform a single fetch operation to fetch from the paged memory:

a multiple cache line width of instruction data, between a minimum width that is greater than one cache line and a maximum width that is a plurality of cache lines, when the multiple cache line width of the instruction data does not include a page boundary of the paged memory, and less than or equal to one cache line width of the instruction data when the multiple cache line width of the instruction data does include the page boundary of the paged memory;

decoder circuitry to decode a single instruction, comprising an opcode, from the instruction data into a decoded instruction; and execution circuitry to execute the decoded instruction according to the opcode.

18. The system of claim 17, wherein the fetch circuitry is to perform the single fetch operation in a single cycle of the system.

19. The system of claim 18, wherein the fetch circuitry is to not support multiple page lookups in a single cycle of the system.

20. The system of claim 17, wherein the fetch circuitry is to not support multiple page lookups in a single cycle of the system.

21. The system of claim 17, wherein the maximum width is two cache lines.

22. The system of claim 21, wherein the two cache lines are 128 Bytes wide.

23. The system of claim 22, wherein the minimum width is 65 Bytes.

24. The system of claim 17, wherein the fetch circuitry is to perform the single fetch operation to fetch from the paged memory:

when in a first mode, the multiple cache line width of the instruction data, between the minimum width that is greater than one cache line and the maximum width that is the plurality of cache lines, when the multiple cache line width of the instruction data does not include the page boundary of the paged memory, and less than or equal to one cache line width of the instruction data when the multiple cache line width of the instruction data does include the page boundary of the paged memory; and when in a second mode, only less than or equal to one cache line width of the instruction data.

\* \* \* \* \*